US010904418B2

(12) United States Patent
Agrawal et al.

(10) Patent No.: US 10,904,418 B2
(45) Date of Patent: Jan. 26, 2021

(54) FOLDABLE ELECTRONIC DEVICE AND METHOD FOR CAPTURING VIEW USING AT LEAST TWO IMAGE SENSORS BASED ON OPERATING MODE CORRESPONDING TO FOLDING ANGLE

(71) Applicant: SAMSUNG ELECTRONICS CO., LTD., Suwon-si (KR)

(72) Inventors: Pulkit Agrawal, Noida (IN); Kaushal Kumar, Noida (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/558,912

(22) Filed: Sep. 3, 2019

(65) Prior Publication Data

US 2020/0084354 A1 Mar. 12, 2020

(30) Foreign Application Priority Data

Sep. 11, 2018 (IN) .............................. 201841034249

(51) Int. Cl.
*H04N 5/225* (2006.01)
*H04N 5/232* (2006.01)
(Continued)

(52) U.S. Cl.
CPC ......... *H04N 5/2258* (2013.01); *H04N 5/2259* (2013.01); *H04N 5/2353* (2013.01);
(Continued)

(58) Field of Classification Search
CPC ............... H04N 5/2258; H04N 5/2259; H04N 5/23232; H04N 5/2353; H04N 5/23245;
(Continued)

(56) References Cited

U.S. PATENT DOCUMENTS 8,754,961 B2 * 6/2014 Leskela ................ H04N 5/2253
  348/239
9,369,622 B2   6/2016 Jeong
(Continued)

FOREIGN PATENT DOCUMENTS

| KR | 10-0836618 B1 | 6/2008 |
| KR | 10-2015-0025195 A | 3/2015 |
| KR | 10-2015-0109992 A | 10/2015 |

OTHER PUBLICATIONS

International Search Report (PCT/ISA/210) dated Sep. 27, 2019 issued by the International Searching Authority in International Application No. PCT/KR2019/007404.
(Continued)

*Primary Examiner* — Hung H Lam
(74) *Attorney, Agent, or Firm* — Sughrue Mion, PLLC

(57) ABSTRACT

Embodiments herein provide a method for capturing view in an electronic device comprising at least two image sensors. The method includes determining a folding angle between a first side of the electronic device including a first image sensor and a second side of the electronic device including a second image sensor. Further, the method also includes capturing a first view of a scene using the first image sensor and capturing a second view of the scene using the second image sensor. Further, the method includes determining whether the first view and the second view partially overlap with each other, completely overlap with each other, or do not overlap with each other based on the folding angle.

20 Claims, 20 Drawing Sheets

(51) Int. Cl.
    *H04N 5/235* (2006.01)
    *H04N 5/262* (2006.01)
    *H04N 5/341* (2011.01)
(52) U.S. Cl.
    CPC ..... *H04N 5/23232* (2013.01); *H04N 5/23238* (2013.01); *H04N 5/23245* (2013.01); *H04N 5/2621* (2013.01); *H04N 5/3415* (2013.01)
(58) Field of Classification Search
    CPC . H04N 5/23238; H04N 5/2621; H04N 5/3415
    See application file for complete search history.

(56) References Cited

U.S. PATENT DOCUMENTS

| | | | | |
|---|---|---|---|---|
| 2004/0141064 A1* | 7/2004 | Ezawa | ............... | H04M 1/0214 348/207.99 |
| 2010/0011291 A1* | 1/2010 | Nurmi | ............... | H04M 1/72583 715/702 |
| 2013/0044240 A1* | 2/2013 | Leskela | ............... | H04N 5/2258 348/239 |
| 2014/0285618 A1* | 9/2014 | Cho | ................... | H04N 5/23238 348/38 |
| 2016/0050408 A1* | 2/2016 | Lee | ........................ | H04N 5/247 348/47 |
| 2016/0295108 A1* | 10/2016 | Cao | ...................... | H04N 17/002 |
| 2016/0381345 A1 | 12/2016 | Wu et al. | | |
| 2017/0052566 A1 | 2/2017 | Ka et al. | | |
| 2017/0075640 A1* | 3/2017 | Chun | ................. | G06F 3/04847 |
| 2017/0094168 A1* | 3/2017 | Kang | ................. | H04N 5/23293 |

OTHER PUBLICATIONS

Written Opinion (PCT/ISA/237) dated Sep. 27, 2019 issued by the International Searching Authority in International Application No. PCT/KR2019/007404.

* cited by examiner

FOLDABLE ELECTRONIC DEVICE AND METHOD FOR CAPTURING VIEW USING AT LEAST TWO IMAGE SENSORS BASED ON OPERATING MODE CORRESPONDING TO FOLDING ANGLE

CROSS REFERENCE TO RELATED APPLICATION

This application is based on and claims priority under 35 U.S.C. § 119 to Indian Patent Application No. 201841034249, filed on Sep. 11, 2018, the disclosure of which is incorporated by reference herein in its entirety.

BACKGROUND

Field

The embodiments herein relate to imaging using electronic devices. More particularly relates to an electronic device and method for capturing view.

Description of the Related Art

In general, electronic devices dominate all aspects of modern life. The electronic devices include image sensors which are used to capture images with a wide variety of photo effects, which enhance the quality of the image. However, the electronic devices with a single image sensor may not be capable of capturing wide angle images/videos without a dedicated wide angle lens as the single image sensor has a limited field of view (FOV). Further, the electronic devices with a dual image sensor also have a fixed FOV and hence the electronic devices cannot capture a portion of a scene which is out of the FOV of the dual image sensors.

Due to the limitations of the single image sensor and the dual image sensor, the electronic devices are not able to provide various photo effects to the images. For example, when the user wants to capture the scene with a panorama effect then the user will have to perform various actions like holding the electronic device in a specific position and horizontally moving the electronic device, etc., which are time consuming and complex and which degrade the user experience.

The above information is presented as background information only to help the reader to understand the present disclosure. Applicants have made no determination and make no assertion as to whether any of the above might be applicable as prior art with regard to the present application.

SUMMARY

In accordance with an aspect of the disclosure, an electronic device and method for capturing view in the electronic device are provided comprising at least two image sensors.

In accordance with an aspect of the disclosure, a bend angle of the at least two image sensors of the electronic device may be determined using at least electromagnets.

In accordance with an aspect of the disclosure, it may be determined whether a first view and a second view partially overlap with each other, completely overlap with each other, or do not overlap with each other based on the bend angle.

In accordance with an aspect of the disclosure, at least one of a first operating mode, a second operating mode, and a third operating mode may be determined based on the first view and the second view of a scene.

In accordance with an aspect of the disclosure, the second view may be captured by the second image sensor in response to detecting a gesture performed to bend the electronic device.

In accordance with an aspect of the disclosure, an overlay group of imaging options of the first image sensor and the second image sensor may be displayed on a composite view of the scene.

In accordance with an aspect of the disclosure, a method for capturing view in an electronic device including at least two image sensors includes capturing by a first image sensor of the at least two image sensors a first view of a scene. Further, the method also includes determining, by the electronic device, a bend angle of a second image sensor of the at least two image sensors of the electronic device and capturing, by the second image sensor, a second view of the scene from the bend angle. Further, the method includes performing at least one action in the electronic device based on the first view, the second view and the bend angle.

In accordance with an aspect of the disclosure, an electronic device includes at least two image sensors for bend angle-based imaging, a memory, a processor, and a bend angle-based imaging management engine. The bend angle-based imaging management engine is configured to capture a first view of a scene using the first image sensor and determine a bend angle of the electronic device. Further, the bend angle-based imaging management engine is also configured to capture a second view of the scene from the bend angle using the second image sensor and perform at least one action in the electronic device based on the first view, the second view and the bend angle.

In accordance with an aspect of the disclosure, a wearable electronic device includes at least two image sensors for bend angle-based imaging, a display part configured to display digital content and a first connection part connected to one side of the display part, the first connection part including a first image sensor. Further, the wearable electronic device also includes a second connection part connected to the other side of the display part, the second connection part including a second image sensor and a comfort part configured to connect the first connection part and the second connection part, the comfort part including a notch to bend at least one of the first image sensor and the second image sensor for performing the bend angle-based imaging.

In accordance with an aspect of the disclosure, a method for capturing view in an electronic device including at least two image sensors includes determining a folding angle between a first side of the electronic device including a first image sensor and a second side of the electronic device including a second image sensor; capturing a first view of a scene using the first image sensor; capturing a second view of the scene using the second image sensor; and determining whether the first view and the second view partially overlap with each other, completely overlap with each other, or do not overlap with each other based on the folding angle.

The determining the folding angle may include measuring a reading of a magnetometer when a first electromagnet and a second electromagnet are turned off; detecting that the first electromagnet is turned on; determining a reading of the magnetometer when the first electromagnet is turned on and the second electromagnet is turned off without folding; determining a difference between the reading of the magnetometer when the first electromagnet and the second electromagnet are turned off and the reading of the magnetometer when the first electromagnet is turned on without folding; determining a reading of the magnetometer when the first electromagnet is turned on and the second electromagnet is turned off with folding; and determining the folding angle of the electronic device based on the difference and the reading of the magnetometer when the first electromagnet is turned on and the second electromagnet is turned off with folding.

The method may further include determining at least one first operating mode when the first view partially overlaps with the second view, at least one second operating mode when the first view completely overlaps with the second view, and a third operating mode when the first view does not overlap with the second view; automatically configuring the electronic device in the determined at least one first, at least one second, or at least one third operating mode; and automatically displaying the first view and the second view of the scene in the determined at least one first, at least one second, or at least one third operating mode.

The at least one first operating mode may be one from among a panorama mode, an object removal mode, and a stereoscopic effect mode, the at least one second operating mode may be one from among a bokeh effect mode, a tilt shift/spot focus mode, a double exposure mode, and a stereoscopic effect mode, and the at least one third operating mode may be one from among a double exposure mode and a background replacement mode.

In the object removal mode, the electronic device may be configured to automatically retain background information in a composite view of the scene when an object is removed from at least one of the first view and the second view.

In the double exposure mode, the electronic device may be configured to automatically blend at least one portion of the first view with at least one portion of the second view to produce a composite view illustrating an artistic effect of double exposure.

In the panorama mode, the electronic device may be configured to automatically stitch at least one overlapping portion of the first view and the second view to produce a composite view.

The composite view in the panorama mode may be produced by determining whether the second image sensor is in an independent operating mode or an assisted operating mode; generating the composite view by stitching the first view of the scene with the second view of the scene when the second image sensor is in the independent operating mode, and generating the composite view by superimposing the second view of the scene with the first view of the scene when the second image sensor is in the assisted operating mode.

In the stereoscopic effect mode, the electronic device may be configured to automatically encode the first view and the second view using filters of different colors and produce a composite view by shifting a perspective of the first view and the second view and overlapping the first view and the second view.

In the bokeh effect mode, the electronic device may be configured to automatically operate the first image sensor in a shorter focal length to capture a first image and the second image sensor in a pan focal length to capture a second image in a same shape as a shape of the first image, and produce a composite view, wherein the composite view is produced by blurring the first view and blending the blurred first view with the second view.

In the tilt shift/spot focus mode, the electronic device may be configured to automatically operate the first image sensor in a shorter focal length to capture a first image and the second image sensor in a linear or radial focal length to capture a second image in a same shape as a shape of the first image, and produce a composite view, wherein the composite view is produced by blurring the first view and blending the blurred first view with the second view.

In the background replacement mode, the electronic device may be configured to automatically identify a primary object in the first view and a secondary object in the second view and produce a composite view by replacing a remaining area in the first view with the secondary object.

The method may further include determining a first group of imaging options of the first image sensor; determining a second group of imaging options of the second image sensor; sorting the first group of imaging options and the second group of imaging options based on user preferences; overlaying a first group of display elements representing the first group of imaging options of the first image sensor over a second group of display elements representing the second group of imaging options of the second image sensor based on the folding angle; and displaying the overlay first and second group of display elements on the composite view of the scene.

The first group of display elements may be overlaid with the second group of display elements by modifying at least one display element representing at least one imaging option from among the first and second group of display elements based on the folding angle.

The method may further include detecting an imaging option selected form the first and second group of imaging options; determining a new folding angle required for the selected imaging option; manipulating the first view and the second view by applying the selected imaging option based on the new folding angle; and displaying the manipulated first view and the manipulated second view on the electronic device.

The method may further include detecting a capture event performed by a user; and capturing the composite view as a single image.

The performing the at least one action in the electronic device based on the first view, the second view and the folding angle may include displaying the first view, the second view and the folding angle on the electronic device; displaying a plurality of display elements representing a plurality of imaging options corresponding to the folding angle on the electronic device; detecting an imaging option selected from the plurality of imaging options; determining a new folding angle required for the selected imaging option; manipulating the first view and the second view by applying the selected imaging option based on the new folding angle; and displaying the manipulated first view and the manipulated second view on the electronic device.

The electronic device may include a first microphone associated with the first image sensor and a second microphone associated with the second image sensor, and the first view may include at least one of image content captured using the first image sensor and audio content captured using the first microphone, and the second view comprises at least one of image content captured using the second image sensor and audio content captured using the second microphone, wherein an intensity of the audio content is dynamically changed based on the folding angle of the electronic device.

The second view may be captured by the second image sensor in response to detecting a gesture performed to fold the electronic device.

The first view of the scene may be different from the second view of the scene.

In accordance with an aspect of the disclosure, an electronic device includes at least two image sensors including a first image sensor and a second image sensor; a memory; at least one processor coupled to the memory, wherein the at least one processor is configured to determine a folding angle between a first side of the electronic device including the first image sensor and a second side of the electronic device including the second image sensor; capture a first view of a scene using the first image sensor; capture a second view of the scene using the second image sensor; and determine whether the first view and the second view partially overlap with each other, completely overlap with each other, or do not overlap with each other based on the folding angle.

The at least one processor may be further configured to measure a reading of a magnetometer when a first electromagnet and a second electromagnet are turned off; detect that the first electromagnet is turned on; determine a reading of the magnetometer when the first electromagnet is turned on and the second electromagnet is turned off without folding; determine a difference between the reading of the magnetometer when the first electromagnet and the second electromagnet are turned off and the reading of the magnetometer when the first electromagnet is turned on without folding; determine a reading of the magnetometer when the first electromagnet is turned on and the second electromagnet is turned off with folding; and determine the folding angle of the electronic device based on the difference and the reading of the magnetometer when the first electromagnet is turned on and the second electromagnet is turned off with folding.

The at least one processor may be further configured to determine whether the first view and the second view partially overlap with each other, completely overlap with each other, or do not overlap with each other based on the folding angle; determine at least one first operating mode when the first view partially overlaps with the second view, at least one second operating mode when the first view completely overlaps with the second view, and a third operating mode when the first view does not overlap with the second view; automatically configure the electronic device in the determined at least one first, at least one second, or at least one third operating mode; and automatically display the first view and the second view of the scene in the determined at least one first, at least one second, or at least one third operating mode.

The at least one first operating mode may be one from among a panorama mode, an object removal mode, and a stereoscopic effect mode, the at least one second operating mode may be one from among a bokeh effect mode, a tilt shift/spot focus mode, a double exposure mode, a stereoscopic effect mode, and the at least one third operating mode may be one from among a double exposure mode and a background replacement mode.

In the object removal mode, the electronic device may be configured to automatically retain background information in a composite view of the scene when an object is removed from at least one of the first view and the second view.

In the double exposure mode, the electronic device may be configured to automatically blend at least one portion of the first view with at least one portion of the second view to produce an composite view illustrating an artistic effect of double exposure.

In the panorama mode, the electronic device may be configured to automatically stitch at least one overlapping portion of the first view and the second view to produce a composite view.

The at least one processor may be further configured to determine whether the second image sensor is in an independent operating mode or an assisted operating mode; generate the composite view by stitching the first view of the scene with the second view of the scene when the second image sensor is in the independent operating mode, and generating the composite view by superimposing the second view of the scene with the first view of the scene when the second image sensor is in the assisted operating mode.

In the stereoscopic effect mode, the electronic device may be configured to automatically encode the first view and the second view using filters of different colors and produce a composite view by shifting a perspective of the first view and the second view and overlapping the first view and the second view.

In the bokeh effect mode, the electronic device may be configured to automatically operate the first image sensor in a shorter focal length to capture a first image and the second image sensor in a pan focal length to capture a second image in a same shape as a shape of the first image, and produce a composite view, wherein the composite view is produced by blurring the first view and blending the blurred first view with the second view.

In the tilt shift/spot focus mode, the electronic device may be configured to automatically operate the first image sensor in a shorter focal length to capture a first image and the second image sensor in a linear or radial focal length to capture a second image in a same shape as a shape of the first image, and produce a composite view, wherein the composite view is produced by blurring the first view and blending the blurred first view with the second view.

In the background replacement mode, the electronic device may be configured to automatically identify a primary object in the first view and a secondary object in the second view and produce a composite view by replacing a remaining area in the first view with the secondary object.

The at least one processor may be further configured to determine a first group of imaging options of the first image sensor; determine a second group of imaging options of the second image sensor; sort the first group of imaging options and the second group of imaging options based on user preferences; overlay a first group of display elements representing the first group of imaging options of the first image sensor over a second group of display elements representing the second group of imaging options of the second image sensor based on the folding angle; and display the overlay first and second group of display elements of the first image sensor and the second image sensor on the composite view of the scene.

The first group of display elements may be overlaid with the second group of display elements by modifying at least one display element representing at least one imaging option from among the first and second group of display elements based on the folding angle.

The at least one processor may be further configured to detect an imaging option selected form the first and second group of imaging options; determine a new folding angle required for the selected imaging option; manipulate the first view and the second view by applying the selected imaging option based on the new folding angle; and display the manipulated first view and the manipulated second view on the electronic device.

The at least one processor may be further configured to detect a capture event performed by a user; and capture the composite view as a single image.

The at least one processor may be further configured to display the first view, the second view and the folding angle on the electronic device; display a plurality of display elements representing a plurality of imaging options corresponding to the folding angle on the electronic device; detect an imaging option selected from the plurality of imaging options; determine a new folding angle required for the selected imaging option; manipulate the first view and the second view by applying the selected imaging option based on the new folding angle; and display the manipulated first view and the manipulated second view on the electronic device.

The electronic device may further include a first microphone associated with the first image sensor and a second microphone associated with the second image sensor, and the first view may include at least one of image content captured using the first image sensor and audio content captured using the first microphone, and the second view may include at least one of image content captured using the second image sensor and audio content captured using the second microphone, wherein an intensity of the audio content is dynamically changed based on the folding angle of the electronic device.

The second view may be captured by the second image sensor in response to detecting a gesture performed to fold the electronic device.

The first view of the scene may be different from the second view of the scene.

In accordance with an aspect of the disclosure, a wearable electronic device includes at least two image sensors including a first image sensor and a second image sensor; a display part configured to display digital content; a first connection part connected to one side of the display part, the first connection part including the first image sensor; a second connection part connected to the other side of the display part, the second connection part including the second image sensor; and a comfort part configured to connect the first connection part and the second connection part, the comfort part comprising a notch to change a folding angle between the first connection part and the second connection part.

The display part may include at least one processor configured to detect a gesture performed on the notch to change the folding angle; determine the folding angle based on the gesture performed on the notch; capture a first view of a scene using the first image sensor; capture a second view of the scene using the second image sensor; and determine whether the first view and the second view partially overlap with each other, completely overlap with each other, or do not overlap with each other based on the folding angle.

The wearable electronic device may further include a first microphone associated with the first image sensor and a second microphone associated with the second image sensor, wherein the first view may include at least one of image content captured using the first image sensor and audio content captured using the first microphone, and the second view may include at least one of image content captured using the second image sensor and audio content captured using the second microphone, wherein an intensity of the audio content is dynamically changed based on the folding angle of the wearable electronic device.

In accordance with an aspect of the disclosure, a foldable electronic device includes a fixed folding axis; a first image sensor provided on a first side of the fixed folding axis; a second image sensor provided on a second side of the fixed folding axis; a sensor configured to determine a folding angle between the first side and the second side; and a processor configured to select an image capturing mode from among a plurality of image capturing modes based on the folding angle.

The plurality of image capturing modes may include a fully overlapping mode in which images captured by the first and second image sensors are fully overlapping, a partially overlapping mode in which the images captured by the first and second image sensors are partially overlapping, and a non-overlapping mode in which the images captured by the first and second image sensors are not overlapping.

The foldable electronic device may further include a display configured to display a first image captured by the first image sensor and a second image captured by the second image sensor, wherein the processor may be further configured to determine photo effects that are made available based on the selected image capturing mode, the determined photo effects being determined from among a plurality of photo effects, and wherein the display may be configured to display a plurality of display elements representing the determined photo effects.

In response to a photo effect being selected that corresponds to an image capturing mode other than the selected image capturing mode, the display may be configured to display a display element representing a new folding angle required by another image capturing mode for which the selected photo effect is made available.

These and other aspects of the embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The disclosure is illustrated in the accompanying drawings, throughout which like reference letters indicate corresponding parts in the various figures. The above and other aspects, features, and advantages of certain embodiments of the present disclosure will be more apparent from the following description taken in conjunction with the accompanying drawings, in which.

DETAILED DESCRIPTION

Figure 1A:
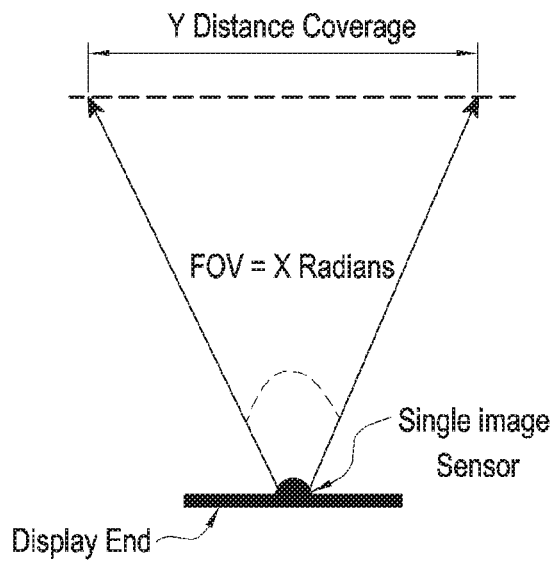
FIG. 1A is an example illustrating a field of view (FOV) of the electronic device with a single image sensor, according to related art.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments.

The term "or" as used herein refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units, engines, managers, modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly the embodiments herein provide a method for bend angle-based imaging in an electronic device comprising at least two image sensors. The method includes capturing by a first image sensor of the at least two image sensors a first view of a scene. Further, the method also includes determining, by the electronic device, a bend angle of a second image sensor of the at least two image sensors of the electronic device based on the gesture and capturing, by the second image sensor, a second view of the scene from the bend angle. Further, the method includes performing at least one action in the electronic device based on the first view, the second view and the bend angle.

In an embodiment, determining the bend angle of the electronic device includes measuring a reading of a magnetometer when a first electromagnet and a second electromagnet are turned-off and detecting that the first electromagnet is turned-on. The method also includes determining a reading of the magnetometer when the first electromagnet is turned-on and the second electromagnet is turned-off without bend and determining a difference between the reading of the magnetometer when the first electromagnet and the second electromagnet are off and the reading of the magnetometer when the first electromagnet is turned-on without bend. Further, the method includes determining a reading of the magnetometer when the first electromagnet is turned-on and the second electromagnet is turned-off with bend and determining the bend angle of the electronic device based on the difference and the reading of the magnetometer when the first electromagnet is turned-on and the second electromagnet is turned-off with bend.

In an embodiment, performing the at least one action in the electronic device based on the first view, the second view and the bend angle includes determining whether the first view and the second view are one of partially overlaps with each other, completely overlaps with each other, and does not overlap with each other based on the bend angle. The method also includes determining at least one first operating mode when the first view partially overlaps with the second view or at least one second operating mode when the first view completely overlaps with the second view, and a third operating mode when the first view does not overlap with the second view. Further, the method also includes automatically configuring the electronic device in the determined first or second or third operating mode and automatically displaying the first view and the second view of the scene in the determined first or second or third operating mode.

In an embodiment, the at least one first operating mode is one of a panorama mode, an object removal mode, and a stereoscopic effect mode, wherein the at least one second operating mode is one of a bokeh effect mode, a tilt shift/spot focus mode, a double exposure mode, a stereoscopic effect mode, and wherein the at least one third operating mode is one of a double exposure mode and a background replacement mode.

In an embodiment, the object removal mode configures the electronic device to automatically retain background information in a composite view of the scene when an object is removed from at least one of the first view and the second view.

In an embodiment, the double exposure mode configures the electronic device to automatically blend at least one portion of the first view with at least one portion of the second view to produce a composite view illustrating an artistic effect of double exposure.

In an embodiment, the panorama mode configures the electronic device to automatically stitch at least one overlapping portion of the first view and the second view to produce a composite view.

In an embodiment, the composite view in the panorama mode is produced by determining whether the second image sensor is in an independent operating mode or assisted operating mode. The method also includes generating the composite view by stitching the first view of the scene with the second view of the scene when the second image sensor is in the independent operating mode or generating the composite view by superimposing the second view of the scene with the first view of the scene when the second image sensor is in the assisted operating mode.

In an embodiment, the stereoscopic effect mode configures the electronic device to automatically encode the first view and the second view using filters of different colors and produce a composite view by shifting a perspective of the first view and the second view and overlapping the first view and the second view.

In an embodiment, the bokeh effect mode configures the electronic device to automatically operate the first image sensor in a shorter focal length to capture a first image and the second image sensor in a pan focal length to capture a second image in exact shape as the first image, and produce a composite view, wherein the composite view is produced by blurring the first view and blending the blurred first view with the second view.

In an embodiment, the tilt shift/spot focus mode configures the electronic device to automatically operate the first image sensor in a shorter focal length to capture a first image and the second image sensor in a linear or radial focal length to capture a second image in exact shape and produce a composite view, wherein the composite view is produced by blurring the first view and blending the blurred first view with the second view.

In an embodiment, the background replacement mode configures the electronic device to automatically identify a primary object and a secondary object in the first view and the second and produce a composite view by replacing remaining area, in at least one of the first view and the second view having the primary object, with the secondary object.

In an embodiment, the method also includes determining a group of imaging options of the first image sensor and determining a group of imaging options of the second image sensor. Further, the method also includes sorting the group of imaging options of the first image sensor and the group of imaging options of the second image sensor based on user preferences. Furthermore, the method includes overlaying the group of imaging options of the first image sensor over the group of imaging options of the second image sensor based on the bend angle and displaying the overlay group of imaging options of the first image sensor and the second image sensor on the composite view of the scene.

In an embodiment, the group of imaging options of the first image sensor is overlaid with the group of imaging options of the second image sensor by modifying the at least one imaging option from the group of imaging option of the at least one of the first image sensor and the second image sensor based on the bend angle.

In an embodiment, the method further includes detecting an imaging option selected form the group of imaging options of the at least one of the first image sensor and the second image sensor and determining a new bend angle corresponding to the selected imaging option. Further, the method also includes manipulating the first view and the second view by applying the selected imaging option based on the new bend angle and displaying the manipulated first view and the manipulated second view on the electronic device In an embodiment, the method further includes detecting a capture event performed by a user and capturing the combined view as a single image.

In an embodiment, performing at least one action in the electronic device based on the first view, the second view and the bend angle includes displaying the first view, the second view and the bend angle on the electronic device and displaying a plurality of imaging options corresponding to the bend angle on the electronic device. The method includes detecting an imaging option selected from the plurality of imaging options and determining a new bend angle corresponding to the selected imaging option. Further, the method also includes manipulating the first view and the second view by applying the selected imaging option based on the new bend angle and displaying the manipulated first view and the manipulated second view on the electronic device.

In an embodiment, the first view comprises at least one of image content and audio content captured using the first image sensor and the second view comprises at least one of image content and audio content captured using the second image sensor, wherein an intensity of the audio content is dynamically changed based on the bend angle of the electronic device.

In an embodiment, the second view is captured by the second image sensor in response to detecting a gesture performed to bend the electronic device.

In an embodiment, the first view and the second view of the scene is same or different.

In conventional methods and systems, a flexible electronic device is controlled using a shape deformation property of the flexible electronic device with no fixed bend axis (i.e., folding axis). Unlike the conventional methods and systems, the proposed electronic device includes a bend axis along which the electronic device is bent (i.e., folded. Further, the bend angle (i.e., folding angle) is used to control the functions of the image sensors of the electronic device.

Unlike the conventional methods and systems, the proposed method allows the user to capture wide angle images/views which are greater than 120 degrees, with dynamic control to adjust the field of view by bending the electronic device without the need for a dedicated wide angle camera module.

Referring now to the drawings, and more particularly to FIGS. 1B through 13, where similar reference characters denote corresponding features consistently throughout the figures, there are shown embodiments of the disclosure.

Figure 1B:
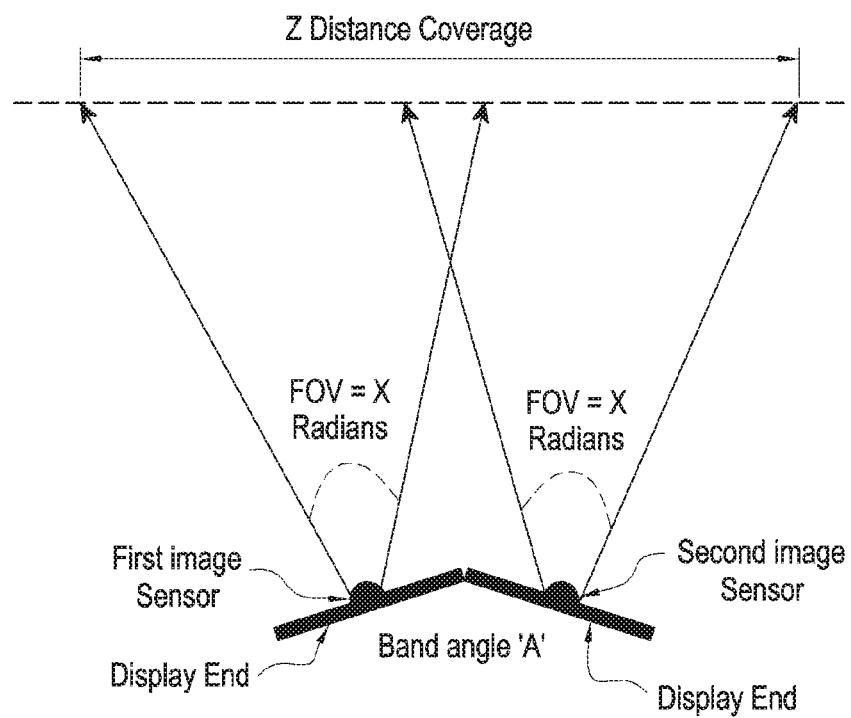
FIG. 1B is an example illustrating the field of view (FOV) of the electronic device with at least two image sensors, according to an embodiment.

FIG. 1B is an example illustrating the field of view (FOV) of an electronic device 100 with at least two image sensors 110, according to an embodiment as disclosed herein.

Unlike the conventional methods and systems, the proposed method includes providing the electronic device with the at least two image sensors. The use of the at least two image sensors enables the electronic device to capture a wider field of view (FOV) thereby capturing a larger portion of the scene.

Referring to the FIG. 1B, in conjunction with FIG. 1A, a distance Z covered by the electronic device 100 with the at least two image sensors is wider than the distance Y covered by the conventional electronic device with a single image sensor. Further, the user can perform the bend gesture on the electronic device to vary the distance covered by the at least two image sensors. Therefore, the distance Z covered by the at least two image sensors is directly proportional to the bend angle A.

Further, the use of the at least two image sensors enables the electronic device to provide various photography effects to the view/image captured by the electronic device, which may not be possible with the conventional electronic device with the single image sensor.

Figure 2A:
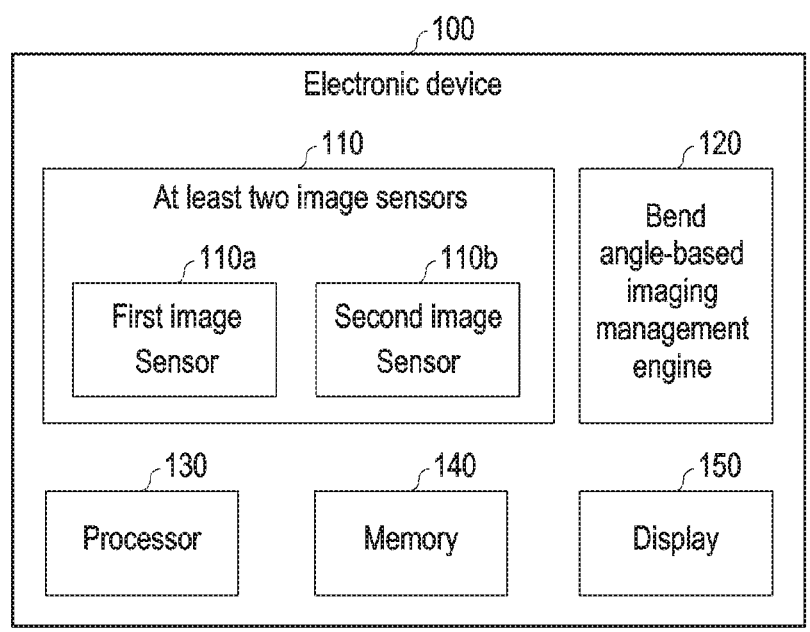
FIG. 2A is a block diagram of the electronic device for providing a bend angle-based imaging, according to an embodiment.

FIG. 2A is a block diagram of the electronic device 100 for providing the bend angle-based imaging, according to an embodiment as disclosed herein.

Referring to the FIG. 2A, the electronic device 100 includes at least two image sensors 110, a bend angle-based imaging management engine 120, a processor 130, a memory 140 and a display 150.

In an embodiment, the at least two image sensors 110 includes the first image sensor 110a and the second image sensor 110b. Further, the first image sensor 110a includes or is associated with a first microphone and the second image sensor 110b includes or is associated with a second microphone. The first image sensor 110a is configured to capture the first view of the scene along with an audio content associated with the first view. The second image sensor 110b is configured to capture the second view of the scene along with an audio content associated with the second view according to the bend angle of the electronic device 100. The first view and the second view may be portions of the same scene or different scenes. Further, the first view and the second view may be overlapping portions of the same scene where the first view will be same as the second view. Further, the first view and the second view are the portions of the scene which are captured within a field of view of the first image sensor 110a and the second image sensor 110b respectively. In an embodiment, the second view of the scene may be captured by the second image sensor 110b in response to detecting a gesture performed to bend the electronic device 100.

In an embodiment, the first view includes at least one of image content and audio content captured using the first image sensor 110a and the second view includes at least one of image content and audio content captured using the second image sensor 110b.

In an embodiment, the bend angle-based imaging management engine 120 is configured to determine the bend angle of the electronic device 100. The bend angle of the electronic device 100 is determined as described in FIG. 5 and FIGS. 6A-6E. The bend angle-based imaging management engine 120 is also configured to perform the at least one action in the electronic device 100 based on the first view, the second view and the bend angle. Further, the bend angle-based imaging management engine 120 is configured to dynamically change an intensity of the audio content captured using the at least one image sensor 110 based on the bend angle of the electronic device 100. Further, the detailed functions performed by the bend angle-based imaging management engine 120 are described with respect to the FIG. 2B.

In an embodiment, when the electronic device 100 is a wearable electronic device, then the bend angle can be varied using a notch on a comfort part which joins a first connection part and a second connection part of the wearable electronic device.

In an embodiment, the processor 130 is configured to interact with the units such as the at least two image sensors 110, the bend angle-based imaging management engine 120, the memory 140 and the display 150 in the electronic device 100 to perform the functionalities of the corresponding units.

The memory unit 140 can include one or more computer-readable storage media. The memory unit 140 can include non-volatile storage elements. Examples of such non-volatile storage elements can include magnetic hard discs, optical discs, floppy discs, flash memories, or forms of electrically programmable memories (EPROM) or electrically erasable and programmable (EEPROM) memories. In addition, the memory unit 140 can, in some examples, be considered a non-transitory storage medium. The term "non-transitory" can indicate that the storage medium is not embodied in a carrier wave or a propagated signal. However, the term "non-transitory" should not be interpreted to mean that the memory unit 140 is non-movable. In some examples, the memory unit 140 can be configured to store larger amounts of information than the memory. In certain examples, a non-transitory storage medium can store data that can, over time, change (e.g., in Random Access Memory (RAM) or cache.

In an embodiment, the display 150 is configured to display the overlay group of imaging options of the first image sensor 110a and the second image sensor 110b on the composite view of the scene, as described later. Further, the display 150 is also configured to display the manipulated first view and the manipulated second view for the electronic device 100 as described later. The display 150 is also configured to display the first view, the second view and the bend angle on the electronic device 100. The display 150 is configured to display the plurality of imaging options corresponding to the bend angle on the electronic device 100 and display the manipulated first view and the manipulated second view on the electronic device 100.

The FIG. 2A shows exemplary system but it is to be understood that other embodiments are not limited thereto. In other embodiments, the system can include fewer or more units in the electronic device 100. Further, the labels or names of the units in the electronic device 100 are used only for illustrative purpose and do not limit the scope of the disclosure. One or more units can be combined together to perform same or substantially similar functions in the system.

Figure 2B:
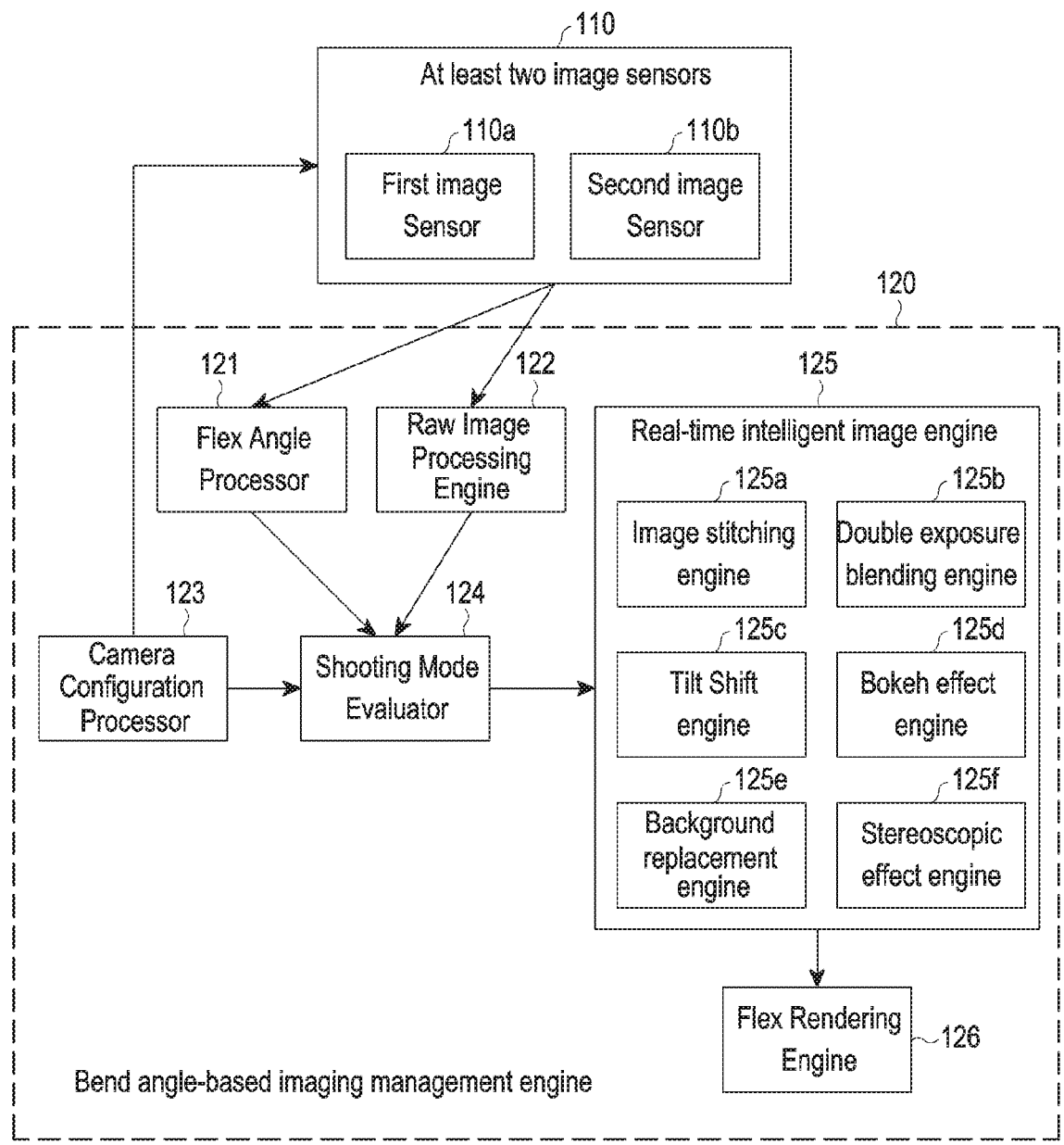
FIG. 2B is a block diagram of the bend angle-based imaging management engine of the electronic device, according to an embodiment.

FIG. 2B is a block diagram of the bend angle-based imaging management engine 120 of the electronic device 100, according to an embodiment as disclosed herein.

Referring to the FIG. 2B, the bend angle-based imaging management engine 120 includes a flex angle processor 121, a raw image processing engine 122, a camera configuration processor 123, a shooting mode evaluator 124, a real-time intelligent image engine 125 and a flex rendering engine 126.

In an embodiment, the flex angle processor 121 is configured to determine the bend angle of the electronic device 100 which is utilized to determine potential photography effects that can be provided by the electronic device 100 based on the bend angle. The information regarding the bend angle provided by the flex angle processor 121 includes an exact bend angle and the angle by which the first view and the second view perspective need to be altered. Further, the flex angle processor 121 is used in conjunction with a first electromagnet (EM-1), a second electromagnet (EM-2) and the single axis magnetometer. Further, the flex angle processor 121 is also configured to detect the imaging option selected from the group of imaging options of the at least one of the first image sensor 110*a* and the second image sensor 110*b* and determine the new bend angle corresponding to the selected imaging option.

In an embodiment, the raw image processing engine 122 is configured to buffer raw camera feeds from the first image sensor 110*a* and the second image sensor 110*b* as per a camera configuration which is applied for that instance. Since the view/image capturing process and view/image processing process are two separate parallel processes with different processing speeds a mid-level buffering mechanism is provided by the raw processing engine 122. The raw image processing engine 122 is also configured to detect a capture event performed by the user and capture the combined view as the single image.

In an embodiment, the camera configuration processor 123 is configured to apply and provide camera configurations of the first view and the second view. Further, the camera configuration processor 123 is also configured to provide the camera configuration data to other modules for decision making in a digital processing phase when the first view and the second view are captured. Further, the camera configuration processor 123 is also configured to automatically configure the electronic device 100 in one of the first operating mode, the second operating mode and the third operating mode.

The camera configuration processor 123 is also configured to determine a group of imaging options of the first image sensor 110*a* and determine a group of imaging options of the second image sensor 110*b*. Further, the camera configuration processor 123 is configured to sort the group of imaging options of the first image sensor 110*a* and the group of imaging options of the second image sensor 110*b* based on user preferences.

In an embodiment, the shooting mode evaluator 124 is configured to receive the inputs from the flex angle processor 121 and the raw processing engine 122. Further, the shooting mode evaluator 124 is configured to determine whether the first view and the second view partially overlap with each other, completely overlap with each other, and do not overlap with each other based on the bend angle determined by the flex angle processor 121. Further, the shooting mode evaluator 124 is configured to determine at least one first operating mode when the first view partially overlaps with the second view, at least one second operating mode when the first view completely overlaps with the second view, and a third operating mode when the first view does not overlap with the second view. The first operating mode is one of a panorama mode, an object removal mode, and a stereoscopic effect mode. The second operating mode is one of a bokeh effect mode, a tilt shift/spot focus mode, a double exposure mode, and a stereoscopic effect mode. The third operating mode is one of a double exposure mode and a background replacement mode. Further, the shooting mode evaluator 124 is also configured to manipulate the first view and the second view of the scene by applying the imaging option selected by the user based on the new bend angle determined by the flex angle processor 121.

In an embodiment, the real-time intelligent image engine 125 includes image stitching engine 125*a*, a double exposure blending engine 125*b*, a tilt/shift engine 125*c*, a bokeh effect engine 125*d*, a background replacement engine 125*e* and a stereoscopic effect engine 125*f*. The real-time intelligent image engine 125 is configured to determine the photography effects that can be made available to be applied to the view captured in the electronic device 100 based on the determined shooting mode. In an embodiment, the image stitching engine 125*a* is configured to automatically stitch the at least one overlapping portion of the first view and the second view to produce a composite view. Further, the image stitching engine 125*a* automatically stitches the first view and the second view by determining whether the second image sensor 110*b* is in an independent operating mode or an assisted operating mode. Further, in response to determining that the second image sensor 110*b* is in the independent operating mode, the image stitching engine 125*a* generates the composite view by stitching the first view of the scene with the second view of the scene. In response to determining that the second image sensor 110*b* is in the assisted operating mode, the image stitching engine 125*a* generates the composite view by superimposing the second view of the scene with the first view of the scene.

In an embodiment, the double exposure blending engine 125*b* is configured to automatically blend at least one portion of the first view with at least one portion of the second view to produce the composite view illustrating an artistic effect of double exposure.

In an embodiment, the tilt/shift engine 125*c* is configured to automatically operate the first image sensor 110*a* in a shorter focal length to capture a first image and the second image sensor 110*b* in a linear or radial focal length to capture a second image. The second image has the same shape as that of the first image. Further, the tilt/shift engine 125*c* is also configured to produce the composite view by blurring the first view, and blending the blurred first view with the second view.

In an embodiment, the bokeh effect engine 125*d* is configured to automatically operate the first image sensor 110*a* in a shorter focal length to capture a first image and the second image sensor 110*b* in a pan focal length to capture a second image in the same shape as the first image. Further, the bokeh effect engine 125*d* is also configured to produce the composite view by blurring the first view and blending the blurred first view with the second view.

In an embodiment, the background replacement engine 125*e* is configured to automatically identify a primary object and a secondary object in the first view and the second view. Further, the background replacement engine 125*e* is also configured to produce the composite view by replacing remaining area, in at least one of the first view and the second view having the primary object, with the secondary object.

In an embodiment, the stereoscopic effect engine 125*f* is configured to automatically encode the first view and the second view using filters of different colors and produce a composite view by shifting a perspective of the first view and the second view and overlapping the first view and the second view.

In an embodiment, the flex rendering engine 126 is configured to automatically generate the composite view with the photography effect applied to the first view and the second view. Further, the flex rendering engine 126 is also configured to overlay the group of imaging options of the first image sensor 110*a* over the group of imaging options of the second image sensor 110*b* based on the bend angle. The group of imaging options of the first image sensor 110*a* is overlaid with the group of imaging options of the second image sensor 110*b* by modifying the at least one imaging option from the group of imaging options of the at least one of the first image sensor 110a and the second image sensor 110b based on the bend angle.

Figure 3A:
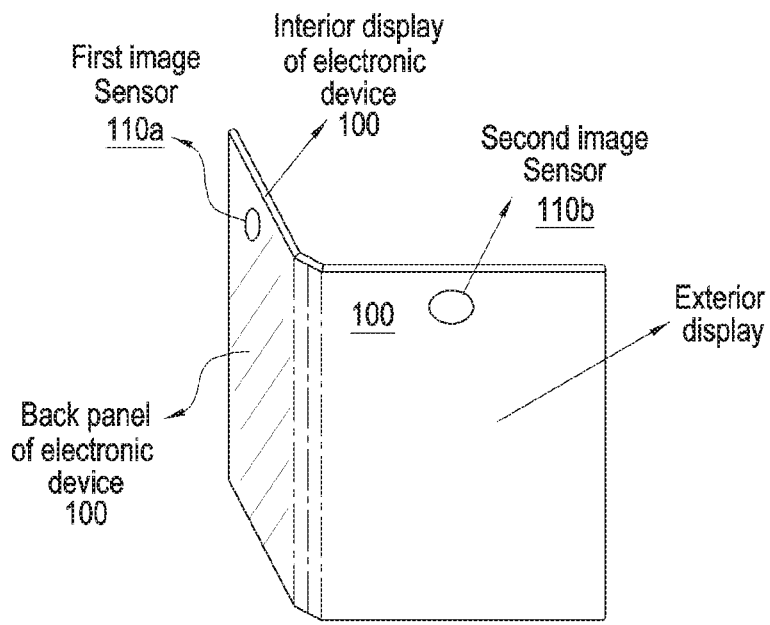
FIGS. 3A-3C illustrate example electronic devices for providing the bend angle-based imaging, according to an embodiment.
Figure 3B:
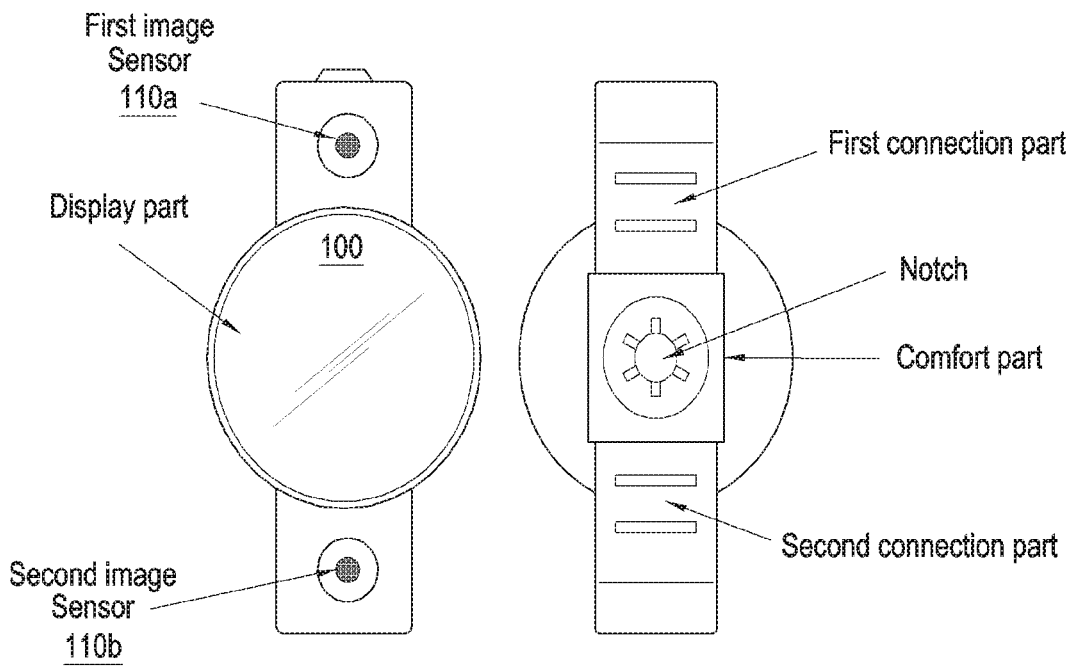
Figure 3C:
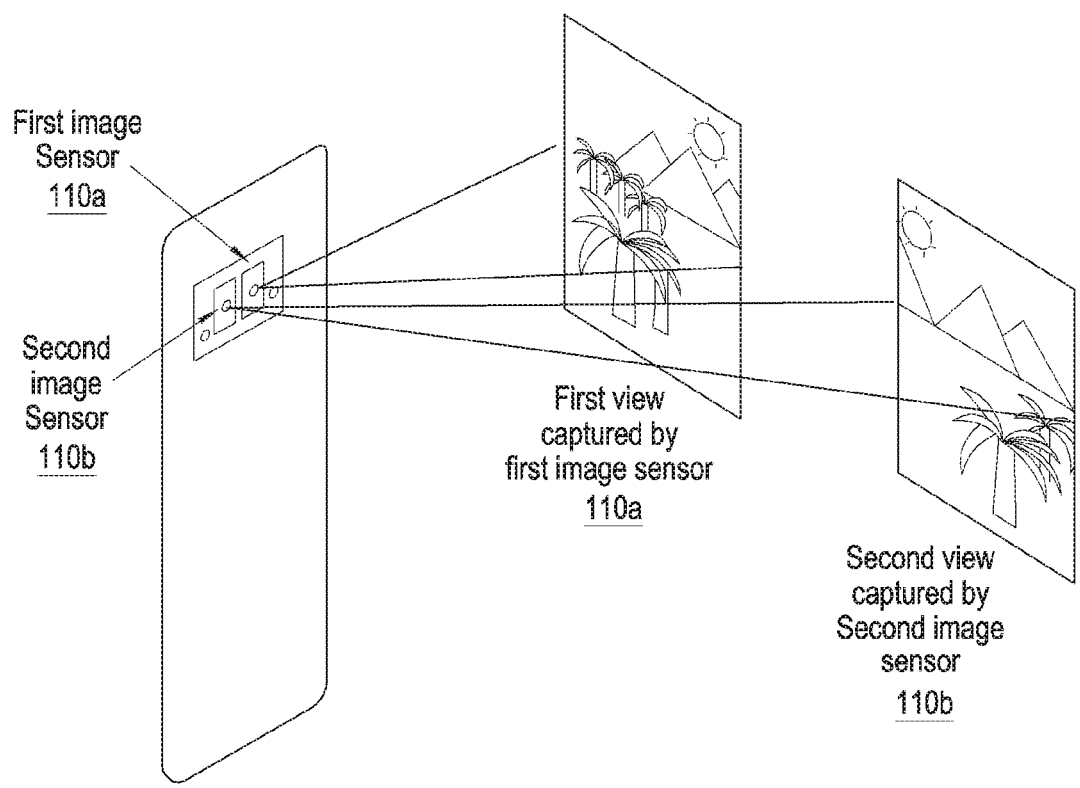

FIGS. 3A-3C illustrate example electronic devices 100 for providing the bend angle-based imaging, according to an embodiment as disclosed herein.

In an embodiment, the electronic device 100 can be foldable and flexible, as shown in FIG. 3A. The electronic device 100 has a fixed axis about which the electronic device 100 can bend. The electronic device 100 which is foldable and flexible includes an exterior display panel and a back panel. The first image sensor 110a and the second image sensor 110b of the at least two imaging sensors are embedded on the back panel and the exterior display panel respectively. Further, the electronic device also includes an interior display. The bend angle in case of the electronic device 100 which is foldable and flexible is the angle between the first image sensor 110a and the second image sensor 110b which can be varied by folding the two panels of the electronic device 100 to various angles.

In an embodiment, the electronic device 100 can be a wearable device such as a watch, as shown in FIG. 3B. The wearable electronic device is provided with the first image sensor 110a and the second image sensor 110b.

The wearable electronic device is provided with a display part which is configured to display digital content. The wearable electronic device is also provided with a first connection part connected to one side of the display part and a second connection part connected to the other side of the display part. The first connection part includes the first image sensor 110a and the second connection part includes the second image sensor 110b. The wearable electronic device also includes a comfort part which is configured to connect the first connection part and the second connection part. The comfort part includes a notch to bend the at least one of the first image sensor 110a and the second image sensor 110b for performing the bend angle-based imaging.

In an embodiment, the electronic device 100 can be a mobile phone, a Smartphone, a Personal Digital Assistant (PDA), a tablet, a display device, an Internet of things (IoT) device, etc., as shown in FIG. 3C. The electronic device 100 is provided with the first image sensor 110a and the second image sensor 110b. The first image sensor 110a captures the first view of the scene and the second image sensor 110b captures the second view of the scene. The bend angle of the second image sensor 110b is the angle by which the electronic device 100 is tilted, after the first view is captured but before the second view is captured, to capture the second view of the scene.

Figure 4A:
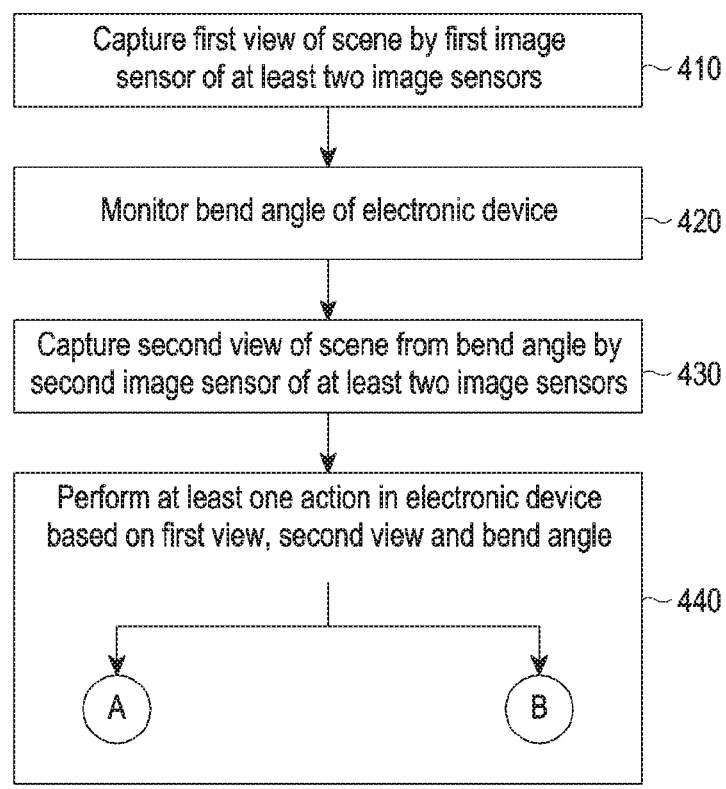
FIGS. 4A-4B are a flow chart for bend angle-based imaging in the electronic device comprising the at least two image sensors, according to an embodiment.

FIG. 4 is a flow chart 400 for bend angle-based imaging in the electronic device 100 comprising the at least two image sensors, according to an embodiment as disclosed herein.

Referring to the FIG. 4, at step 410, the electronic device 100 captures the first view of the scene by the first image sensor 110a (as illustrated in FIG. 2A) of the at least two image sensors 110.

At step 420, the electronic device 100 monitors the bend angle of the electronic device 100. For example, in the electronic device 100 as illustrated in the FIG. 2A, the bend angle-based imaging management engine 120 can be configured to monitor the bend angle of the electronic device 100.

At step 430, the electronic device 100 captures the second view of the scene from the bend angle by the second image sensor 110b of at least two image sensors 110.

At step 440, the electronic device 100 performs the at least one action based on the first view, the second view and the bend angle. For example, in the electronic device 100 as illustrated in the FIG. 2A, the bend angle-based imaging management engine 120 can be configured to perform the at least one action based on the first view, the second view and the bend angle.

Figure 4B:
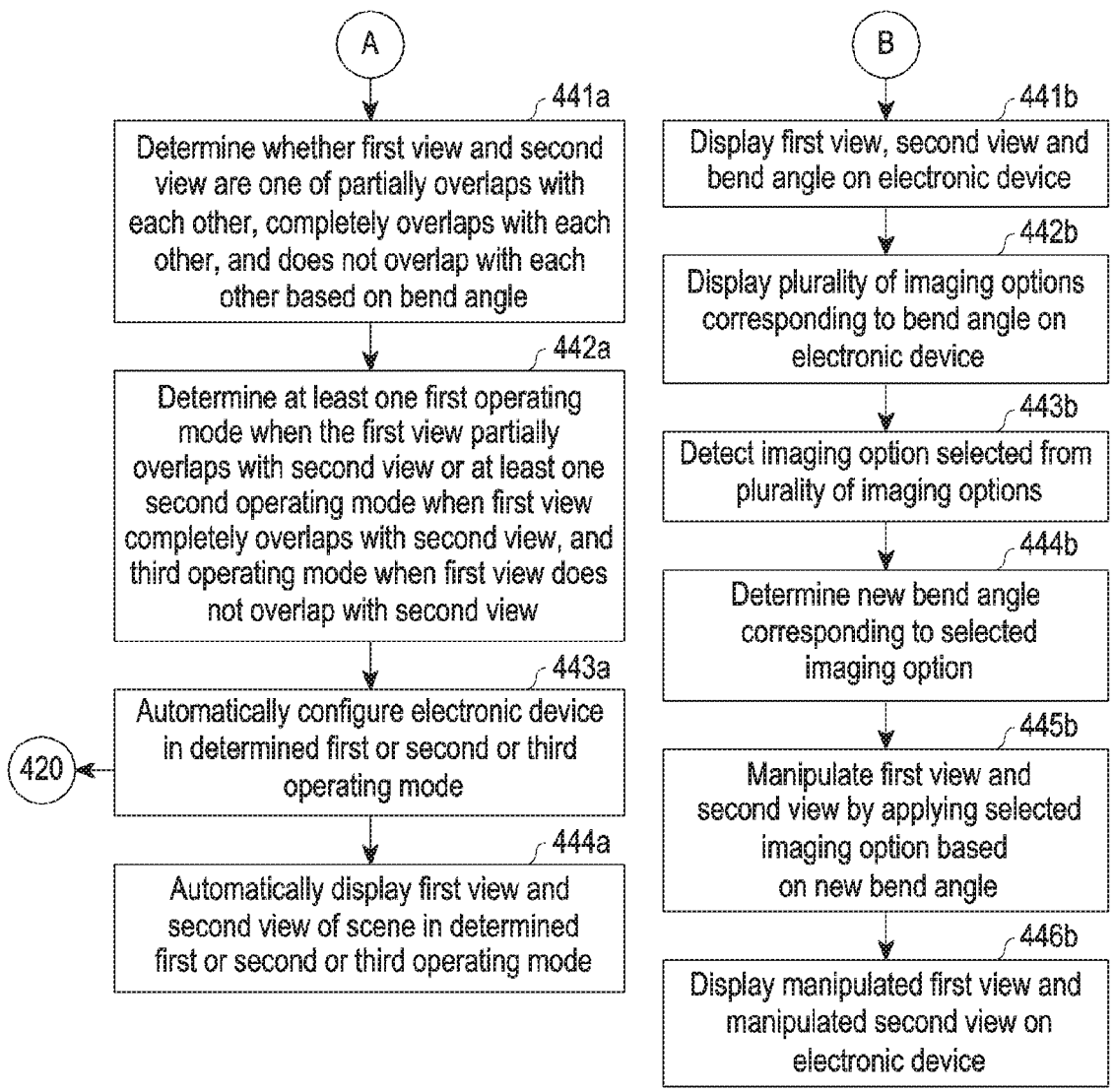

As shown in FIG. 4B, at step 441a, the electronic device 100 determines whether the first view and the second view partially overlap with each other, completely overlap with each other, or do not overlap with each other based on bend angle. For example, in the electronic device 100 as illustrated in the FIG. 2A, the bend angle-based imaging management engine 120 can be configured to determine whether the first view and the second view partially overlap with each other, completely overlap with each other, or do not overlap with each other based on bend angle.

At step 442a, the electronic device 100 determines at least one first operating mode when the first view partially overlaps with the second view, at least one second operating mode when the first view completely overlaps with the second view and at least one third operating mode when the first view does not overlap with the second view. For example, in the electronic device 100 as illustrated in the FIG. 2A, the bend angle-based imaging management engine 120 can be configured to determine at least one first operating mode when the first view partially overlaps with the second view, at least one second operating mode when the first view completely overlaps with the second view and at least one third operating mode when the first view does not overlap with the second view.

At step 443a, the electronic device 100 automatically configures itself in the determined first, second or third operating mode. For example, in the electronic device 100 as illustrated in the FIG. 2A, the bend angle-based imaging management engine 120 can be configured to automatically configure the electronic device 100 in the determined first, second or third operating mode. Further, the electronic device 100 simultaneously loops to step 420 and continues to monitor the bend angle of the electronic device 100. On determining the change in the bend angle, the steps after 420 are repeated.

At step 444a, the electronic device 100 automatically displays the first view and the second view of the scene in the determined first, second or third operating mode. For example, in the electronic device 100 as illustrated in the FIG. 2A, the bend angle-based imaging management engine 120 can be configured to automatically display the first view and the second view of the scene in the determined first, second or third operating mode.

At step 441b, the electronic device 100 displays the first view, the second view and the bend angle. For example, in the electronic device 100 as illustrated in the FIG. 2A, the display 150 can be configured to display the first view, the second view and the bend angle.

At step 442b, the electronic device 100 displays the plurality of imaging options corresponding to the bend angle. For example, in the electronic device 100 as illustrated in the FIG. 2A, the display 150 can be configured to display the plurality of imaging options corresponding to the bend angle.

At step 443b, the electronic device 100 detects the imaging option selected (e.g., by a user) from the plurality of imaging options. For example, in the electronic device 100 as illustrated in the FIG. 2A, the bend angle-based imaging management engine 120 can be configured to detect the imaging option selected from the plurality of imaging options.

At step 444b, the electronic device 100 determines the new bend angle corresponding to the selected imaging option. For example, in the electronic device 100 as illustrated in the FIG. 2A, the bend angle-based imaging management engine 120 can be configured to determine the new bend angle corresponding to the selected imaging option.

At step 445b, the electronic device 100 manipulates the first view and the second view by applying the selected imaging option based on the new bend angle. For example, in the electronic device 100 as illustrated in the FIG. 2A, the bend angle-based imaging management engine 120 can be configured to manipulate the first view and the second view by applying the selected imaging option based on the new bend angle.

At step 446b, the electronic device 100 displays the manipulated first view and the manipulated second view. For example, in the electronic device 100 as illustrated in the FIG. 2A, the display 150 can be configured to display the manipulated first view and the manipulated second view.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the disclosure.

Figure 5:
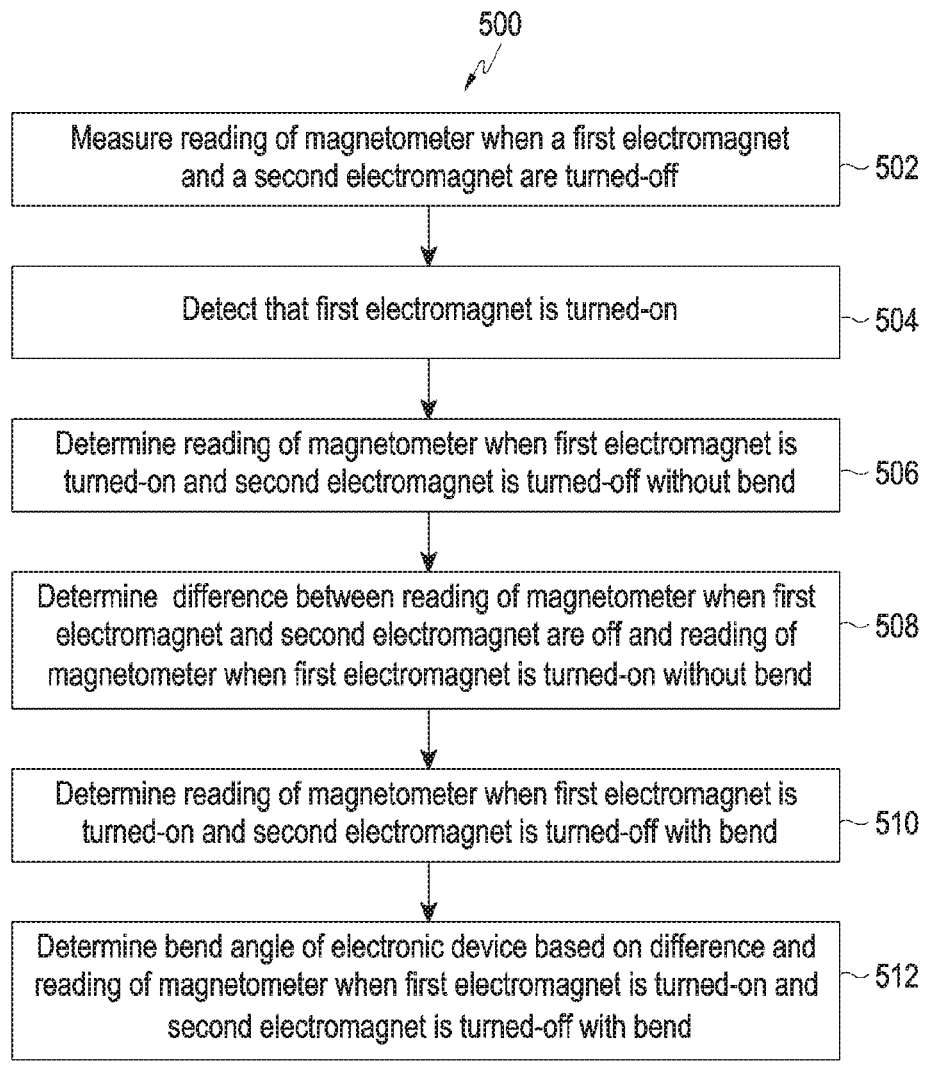
FIG. 5 is a flow chart for determining the bend angle of the electronic device, according to an embodiment.

FIG. 5 is a flow chart 500 for determining the bend angle of the electronic device 100, according to an embodiment as disclosed herein.

Referring to the FIG. 5, at step 502, the electronic device 100 measures the reading of the magnetometer when the first electromagnet and the second electromagnet are turned off. For example, in the electronic device 100 as illustrated in the FIG. 2A, the bend angle-based imaging management engine 120 can be configured to measure the reading of the magnetometer when the first electromagnet and the second electromagnet are turned off.

At step 504, the electronic device 100 detects that the first electromagnet is turned on. For example, in the electronic device 100 as illustrated in the FIG. 2A, the bend angle-based imaging management engine 120 can be configured to detect that the first electromagnet is turned on.

At step 506, the electronic device 100 determines a reading of the magnetometer when the first electromagnet is turned on and the second electromagnet is turned off without bend (i.e., when the electronic device 100 is not folded). For example, in the electronic device 100 as illustrated in the FIG. 2A, the bend angle-based imaging management engine 120 can be configured to determine reading of magnetometer when first electromagnet is turned on and second electromagnet is turned off without bend.

At step 508, the electronic device 100 determines a difference between the reading of the magnetometer when first electromagnet and second electromagnet are off and the reading of the magnetometer when first electromagnet is turned on without bend. For example, in the electronic device 100 as illustrated in the FIG. 2A, the bend angle-based imaging management engine 120 can be configured to determine a difference between the reading of the magnetometer when first electromagnet and second electromagnet are off and the reading of the magnetometer when first electromagnet is turned on without bend.

At step 510, the electronic device 100 determines a reading of the magnetometer when the first electromagnet is turned on and the second electromagnet is turned off with bend. For example, in the electronic device 100 as illustrated in the FIG. 2A, the bend angle-based imaging management engine 120 can be configured to determine a reading of the magnetometer when the first electromagnet is turned on and the second electromagnet is turned off with bend.

At step 512, the electronic device 100 determines the bend angle of electronic device 100 based on the determined difference and the reading of magnetometer when the first electromagnet is turned on and the second electromagnet is turned off with bend. For example, in the electronic device 100 as illustrated in the FIG. 2A, the bend angle-based imaging management engine 120 can be configured to determine the bend angle of electronic device 100 based on the determined difference and the reading of the magnetometer when the first electromagnet is turned on and the second electromagnet is turned off with bend. Further, the step 504 to step 512 are repeated by alternatively turning on the second electromagnet and turning off the first electromagnet.

Therefore, in order to determine the bend angle of the electronic device 100, the steps from 504 to 512 are performed by alternatively turning on and turning off the first electromagnet and the second electromagnet.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the disclosure.

FIGS. 6A-6E illustrate the determination of the bend angle of the electronic device 100 based on a gesture, according to an embodiment as disclosed herein.

According to the proposed method, the electronic device 100 is provided with an arrangement of two electromagnets and a single axis magnetometer to determine the bending angle of the electronic device 100. The two electromagnets, i.e., a first electromagnet (EM-1) and a second electromagnet (EM-2) are placed on either side of a bend axis of the electronic device 100. A polarity of the first electromagnet and the second electromagnet are along the plane of the display of the electronic device 100. The bend axis of electronic device 100 is provided with the single axis magnetometer and the axis of the single axis magnetometer is calibrated when no bending orientation is performed.

Figure 6A:
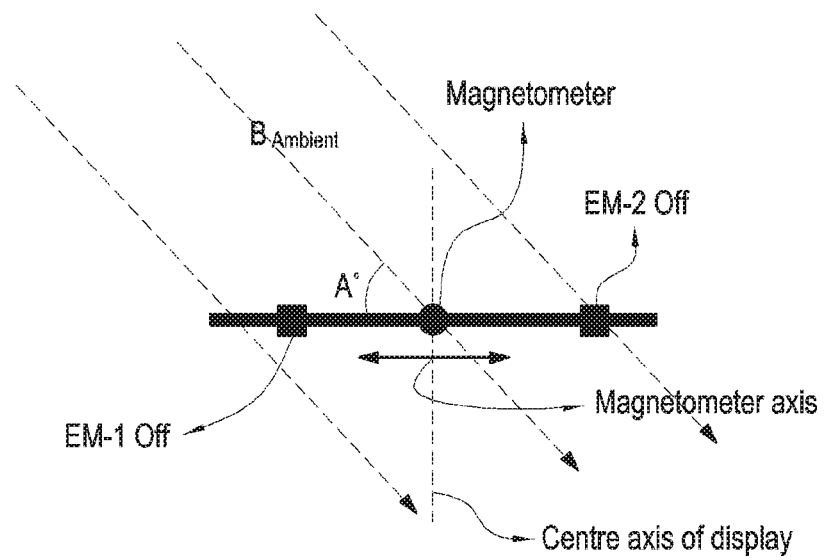
FIGS. 6A-6E illustrate the determination of the bend angle of the electronic device based on the gesture, according to an embodiment.

Referring to the FIG. 6A, the ambient magnetic field ($B_{Ambient}$) at that moment of orientation along the bend axis of the electronic device 100 is determined by switching off the first electromagnet and the second electromagnet. Further, the electronic device 100 is not bent while determining the ambient magnetic field.

Therefore, $$\text{Reading of the single axis magnetometer} = B_{Ambient} \cos A \quad (1)$$

Figure 6B:
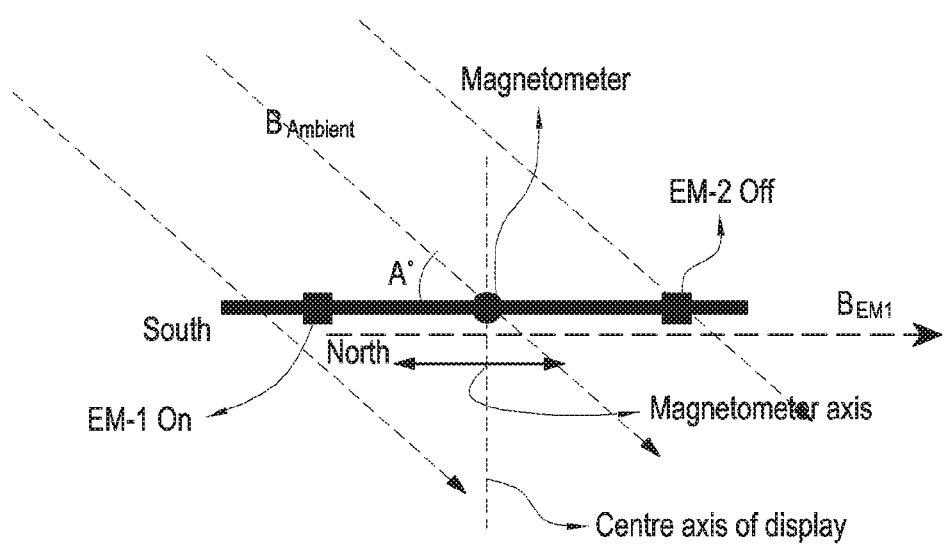

Referring to the FIG. 6B, the electronic device 100 detects that the first electromagnet (EM-1) is turned on for a specific duration of time. When the EM-1 is turned on, the polarity of the EM-1 leads to an electromagnetic field in the single axis magnetometer which is at the axis of the electronic device 100. The electronic device 100 then records a reading of the single axis magnetometer when the EM-1 is turned on and the EM-2 is turned off without the bend in the electronic device 100.

Reading of Magnetometer when the EM-1 is turned on and the EM-2 is turned off without bend = $B_{Ambient} \cos A + B_{EM1}$ therefore, $$B_{EM1} = \text{Reading of Magnetometer (when the } EM\text{-1 is turned on and the } EM\text{-2 is turned off with no bend)} - B_{Ambient} \cos A \quad (2)$$

Further, the ambient magnetic field generated when the EM-1 and the EM-2 are turned off is cancelled in both cases of no bend position and the bending position.

Figure 6C:
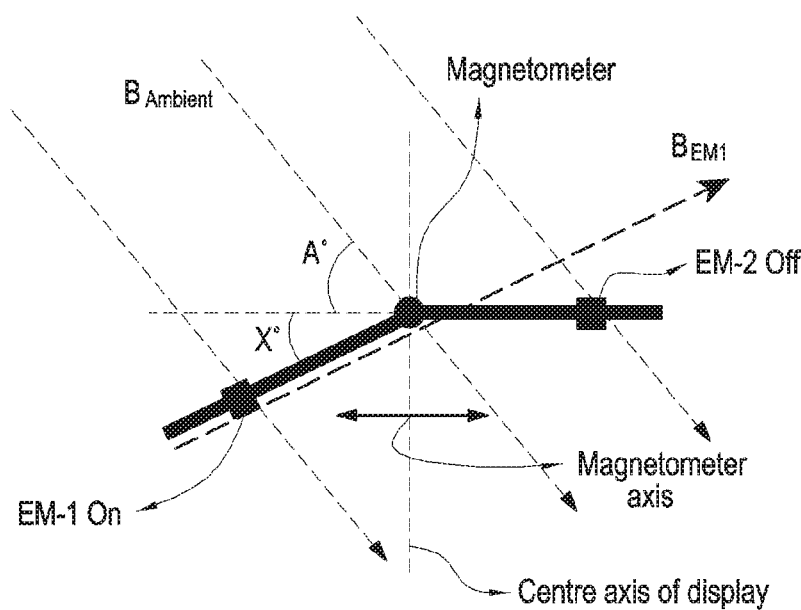
Figure 6C:
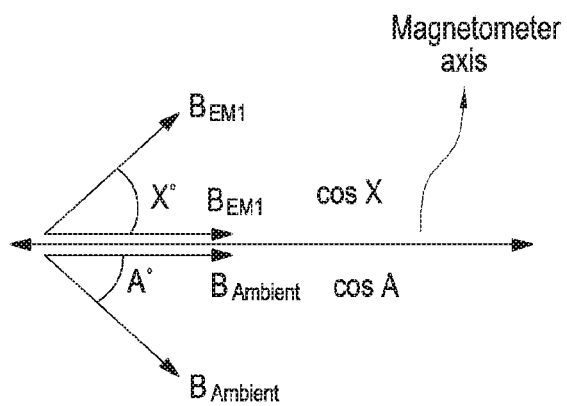

Referring to the FIG. 6C, the electronic device 100 determines the reading of the single axis magnetometer when the EM-1 is turned on and the EM-2 is turned off after the bend gesture is performed by the user.

Then, Reading of Magnetometer when the EM-1 is turned on and the EM-2 is turned off with bend=$B_{Ambient}$ Cos A+$B_{EM1}$ Cos X Here, X represents the left bend angle as shown in FIG. 6c. Therefore, the left bend angle X can be obtained as:

$$\text{Cos } X = (\text{Reading of Magnetometer (when the } EM\text{-1 is turned on and the } EM\text{-2 is turned off with bend)} - B_{Ambient} \text{ Cos } A)/B_{EM1} \quad (3)$$

Figure 6D:
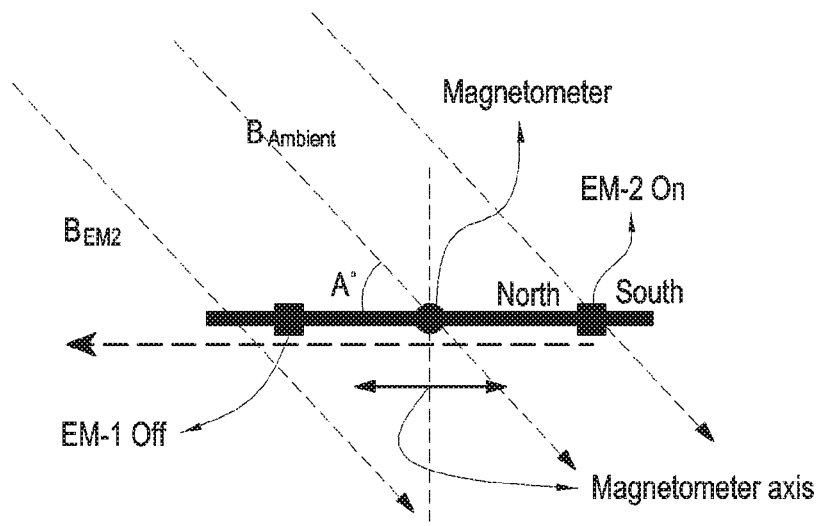

Referring to FIG. 6D, the electronic device 100 detects that the EM-2 is turned on and records a reading of the single axis magnetometer when the EM-1 is turned off and the EM-2 is turned on without the bend in the electronic device 100.

Reading of Magnetometer when the EM-2 is turned on and the EM-1 is turned off without bend=$B_{Ambient}$ Cos A−$B_{EM2}$
therefore, $$B_{EM2} = \text{Reading of Magnetometer (when the } EM\text{-2 is turned on and the } EM\text{-1 is turned off with no bend)} - B_{Ambient} \text{ Cos } A \quad (4)$$

Figure 6E:
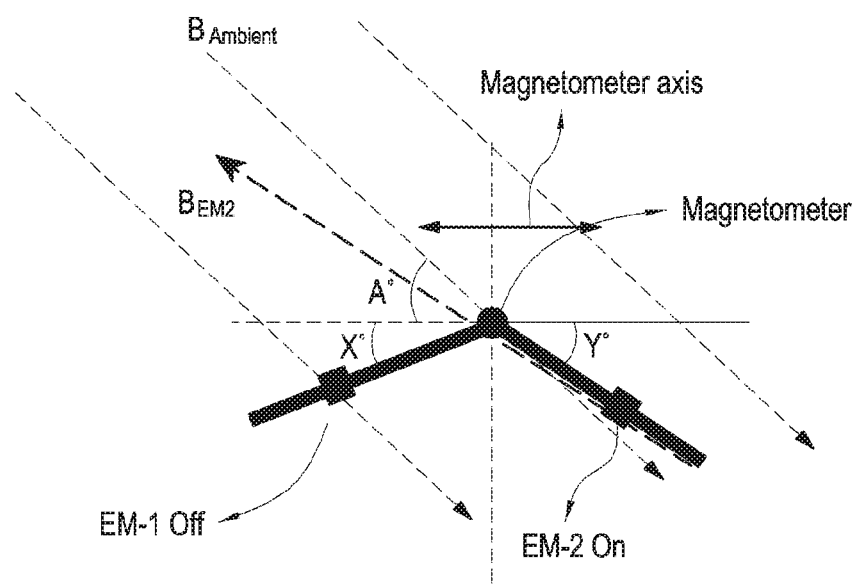

Referring to FIG. 6E, the electronic device 100 determines the reading of the single axis magnetometer when the EM-2 is turned on and the EM-1 is turned off after the bend gesture is performed by the user.

Then, Reading of Magnetometer when the EM-2 is turned on and the EM-1 is turned off with bend=$B_{Ambient}$ Cos A−$B_{EM1}$ Cos Y Here, Y represents the right bend angle as shown in FIG. 6D. Therefore, the right bend angle Y can be obtained as:

$$\text{Cos } Y = (\text{Reading of Magnetometer (when the } EM\text{-2 is turned on and the } EM\text{-1 is turned off with bend)} - B_{Ambient} \text{ Cos } A)/B_{EM2} \quad (5)$$

The equation (3) and the equation (5) are used to determine the differential bend angle of each side of the bend axis of the electronic device 100 one at a time by switching on the electromagnets alternatively on either sides of the bend axis. Further, the interval of switching the electromagnets can be set in the electronic device 100. Further, the first electromagnet and the second electromagnet can be synchronously polarized one at a time to calculate the relative bending of the display side of the electronic device 100.

When the first electromagnet is polarized, the relative bending can be derived from the effective magnetic field value at that configuration. Similarly after calculating bend degree of one side of the electronic device 100, the second electromagnet is turned on and the bend degree is calculated by the change in magnetic field at the magnetometer position. Since the amount of current passed through the electromagnets is known, the magnitude of generated polarity can be used to calculate the magnetic field generated by the electromagnets. The two electromagnets are used instead of permanent magnets so that the two electromagnets can be turned on/turned off and the polarity of the two electromagnets is more useful than the permanent magnets.

Figure 7A:
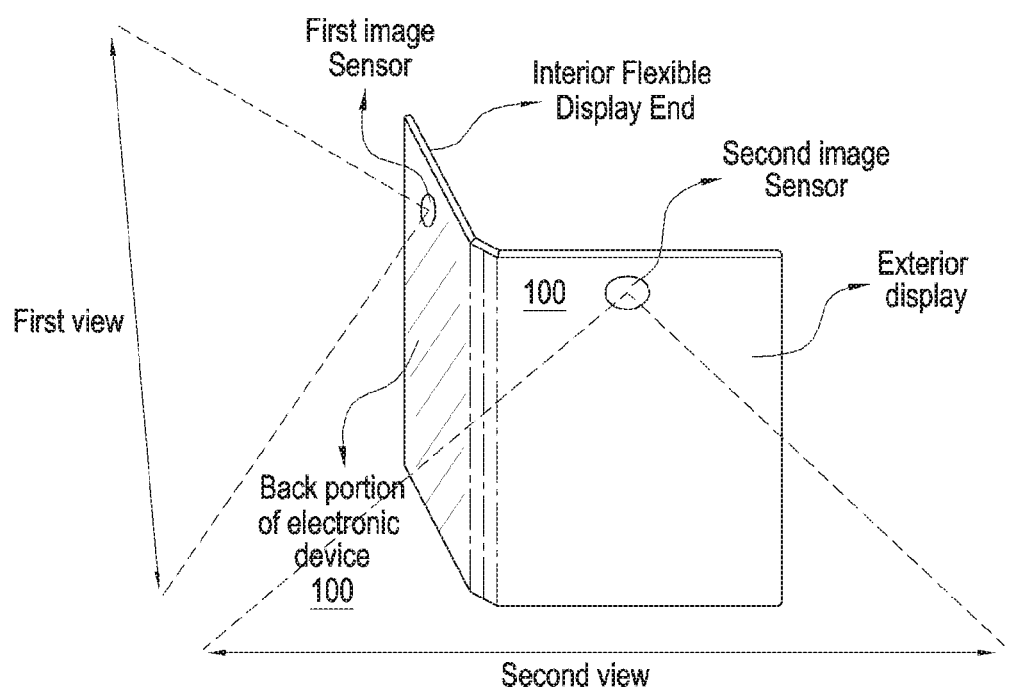
FIG. 7A is an example illustrating the electronic device with the at least two image sensors used for capturing a composite view of a scene, according to an embodiment.

FIG. 7A is an example illustrating the electronic device 100 with the at least two image sensors 110 used for capturing the composite view of the scene, according to an embodiment as disclosed herein.

Consider that the user wants to capture the scene using the electronic device 100 with the at least two image sensors 110.

Referring to the FIG. 7A, the first view is captured by the first image sensor 110a of the at least two image sensors 110. Further, the electronic device 100 determines the bend angle, i.e., the angle by which the electronic device 100 is bent to capture the second view by the second image sensor 110b of the at least two image sensor 110 of the electronic device 100. Further, the electronic device 100 performs the at least one action based on the first view, the second view and the bend angle. Further, various portions of the scene can be captured by changing the bend angle of the electronic device 100.

In an embodiment, the electronic device 100 determines the bend gesture performed by the user and in response to the bend gesture performed by the user, captures the second view of the scene.

When the electronic device 100 is activated, the electronic device 100 determines whether the first view and the second view partially overlap with each other, completely overlap with each other or do not overlap with each other based on the bend angle. Further, the electronic device 100 determines the mode of operation as the first operating mode when the first view partially overlaps with the second view, the second operating mode when the first view completely overlaps with the second view and the third operating mode when the first view does not overlap with the second view. Further, the electronic device 100 is automatically configured in the determined first, second or third operating mode.

Figure 7B:
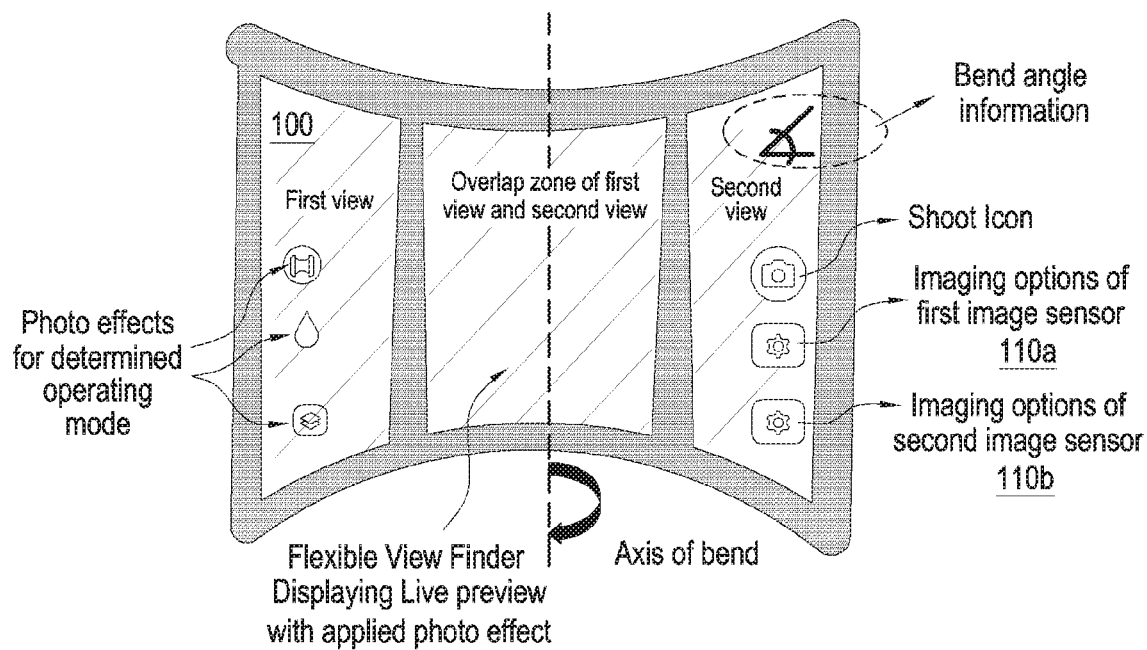
FIG. 7B is an example illustration for capturing the composite view of the scene by the electronic device with the at least two image sensors, according to an embodiment.

FIG. 7B is an example illustration for capturing the composite view of the scene by the electronic device 100 with the at least two image sensors 110, according to an embodiment as disclosed herein.

In conjunction with FIG. 7A, consider that the first view and the second view overlap partially with each other. The electronic device 100 determines that the mode of operation is the first operating mode which includes the photography modes such as one of the panorama mode, the object removal mode, and the stereoscopic effect mode which can be applied on the first view and the second view. The electronic device 100 provides the list of photography modes on the screen as shown in FIG. 7B. Further, the electronic device 100 determines that the user has selected the panorama mode from the list of photography modes provided on the screen. In response to the user selection of the panorama mode, the electronic device 100 is automatically configured to stitch the first view and the second view about the axis of the electronic device 100 to produce the composite view.

Further, the electronic device 100 determines the group of imaging options associated with the first image sensor 110a and the second image sensor 110b. Further, the electronic device 100 sorts the group of imaging options of the first image sensor 110a and the second image sensor based on user preferences. Further, the electronic device 100 overlays and displays the overlay group of imaging options of the first image sensor 110a and the second image sensor 110b on the composite view of the scene, as shown in FIG. 7B.

In another example consider that the user has manually selected the panorama imaging option without taking into consideration whether the first view and the second view is partially overlapping. In such a scenario, the electronic device 100 determines that the user has selected the panorama imaging option from the group of imaging options of the at least one of the first image sensor 110*a* and the second image sensor 110*b*. Further, the electronic device 100 determines the requisite new bend angle corresponding to the panorama imaging option and provides the new bend angle information on the screen. The new bend angle information provided on the screen enables the user to know the angle by which the electronic device 100 must be bent to be able to apply the select imaging option (i.e., the panorama imaging option).

Further, the electronic device 100 determines that the user has achieved the required new bend angle and manipulates the first view and the second view by applying the panorama imaging option and displays the manipulated composite view of the scene in the panorama mode on the electronic device 100.

FIGS. 8A-8D are examples illustrating the application of the object removal effect in the first operating mode to the composite view of the scene, according to an embodiment as disclosed herein.

Figure 8A:
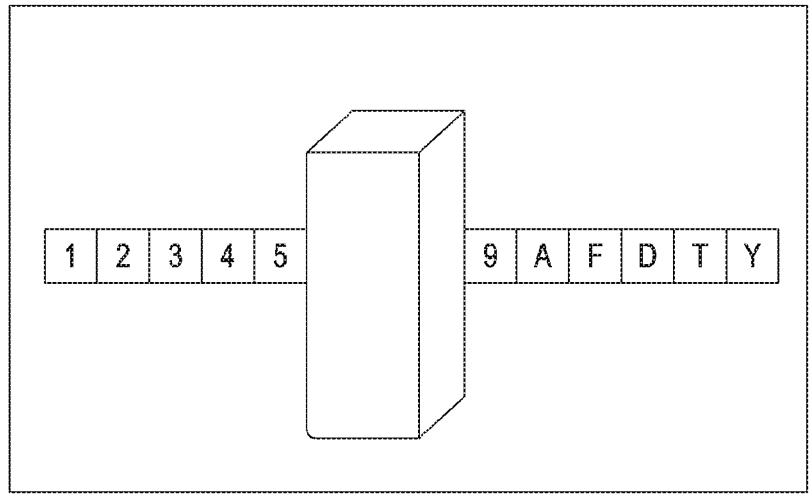
FIGS. 8A-8D are examples illustrating the application of an object removal effect in a first operating mode to the composite view of the scene, according to an embodiment.

Referring to the FIG. 8A, consider the scene where a number series is displayed on a wall. An object present in the front of the wall obstructs the user from capturing the numbers behind the object on the wall, as shown in FIG. 8A.

Figure 8B:
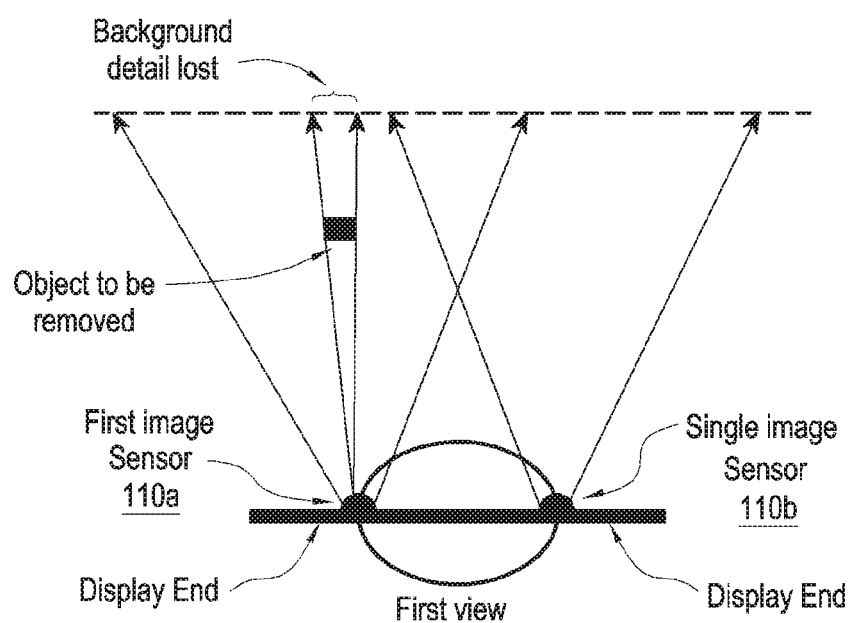

Referring to the FIG. 8B, the field of view of the first image sensor captures the first view of the image which includes the object. The presence of the object leads to the background information (i.e., the information obscured by the object) to be lost. Further, the field of view of the second image sensor overlaps with the field of view of the first image sensor. However, the second image sensor is not able to capture the number series which is behind the object. The electronic device 100 determines that the first view and the second view are partially overlapping in the live preview. Further, the electronic device 100 determines that the first image sensor and the second image sensor have to be operated in the first operating mode as the first view and the second view partially overlap with each other. Further, the electronic device 100 displays the imaging options associated with the first operating mode and detects that the imaging option selected by the user is the object removal effect.

Figure 8C:
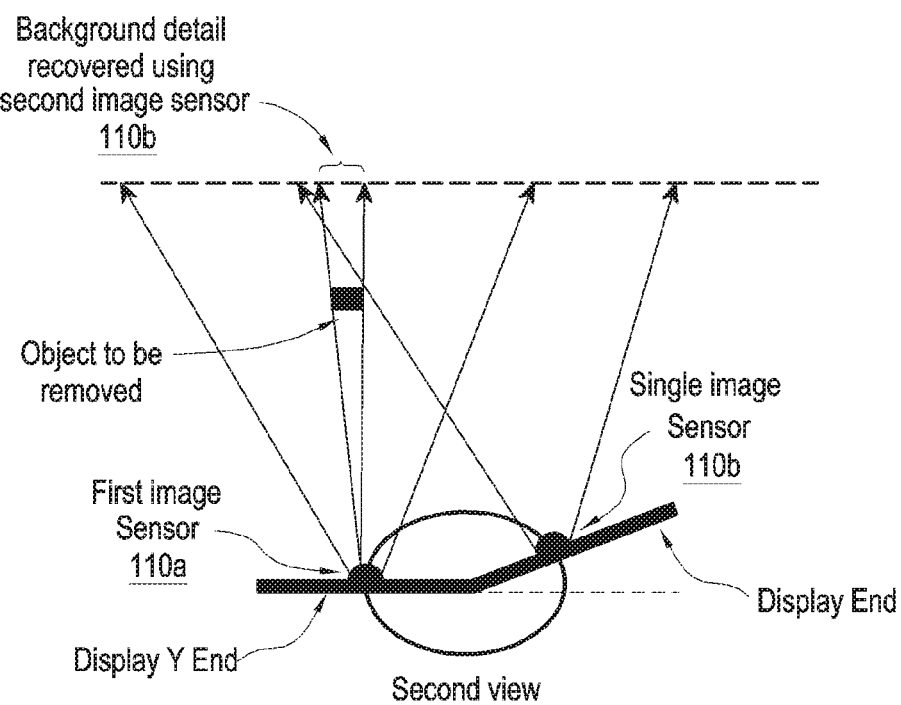
Figure 8D:
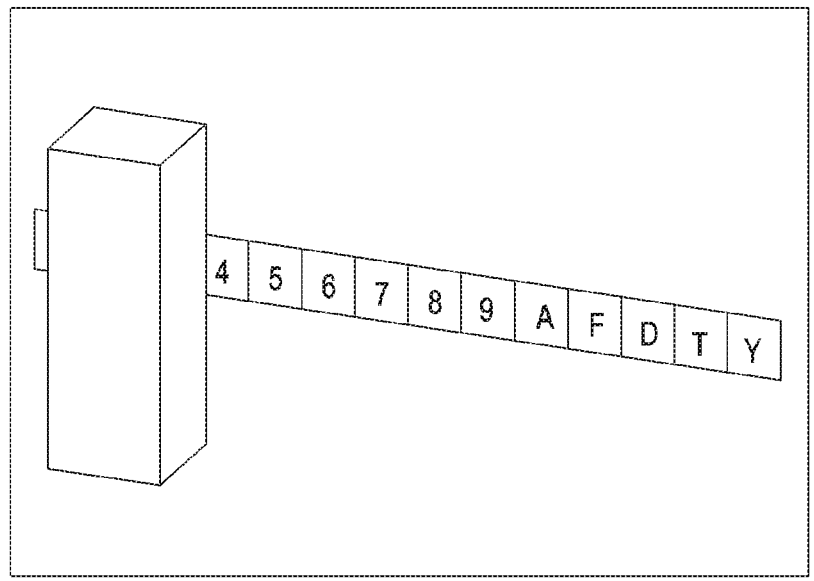

On determining that the imaging option selected by the user is the object removal effect, the electronic device 100 displays the new bend angle required to capture the information behind the object. Further, based on the new bend angle information provided by the electronic device 100, the user performs the appropriate bend gesture to achieve the new bend angle. At the new bend angle, the second image sensor is able to recover the information behind the object, as shown in FIGS. 8C and 8D.

Figure 9:
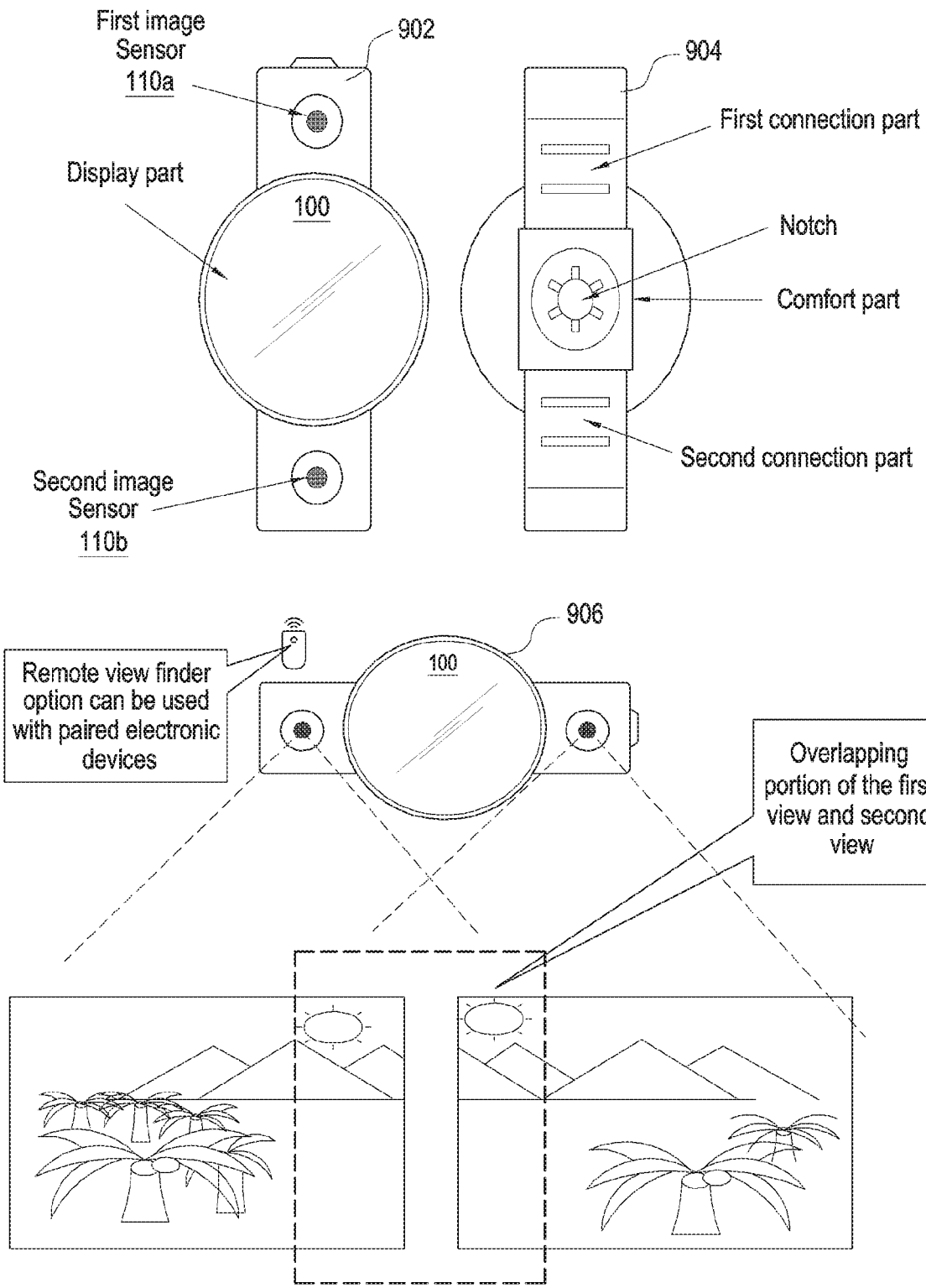
FIG. 9 is an example illustration for capturing a first view and a second view of the scene using a wearable electronic device, according to an embodiment.

FIG. 9 is an example illustration for capturing the first view and the second view of the scene using the wearable electronic device, according to an embodiment as disclosed herein.

Referring to the FIG. 9, at step 902, the wearable electronic device is placed such that the first image sensor 110*a* and the second image sensor 110*b* face the scene to be captured. At step 904, the notch provided at the comfort portion of the wearable electronic device can be used to change the bend angle required to capture the first view and the second view of the scene.

Further at step 906, the first view and the second view of the scene are captured with wider and dynamic wide angle coverage due to the use of the notch which enables the user to change the bend angle of the wearable electronic device, as shown in FIG. 9. Furthermore, the remote view finder option enables other electronic devices which are paired with the wearable electronic device to control and determine the photo effects that can be applied to the first view and the second view captured by the wearable electronic device.

Figure 10:
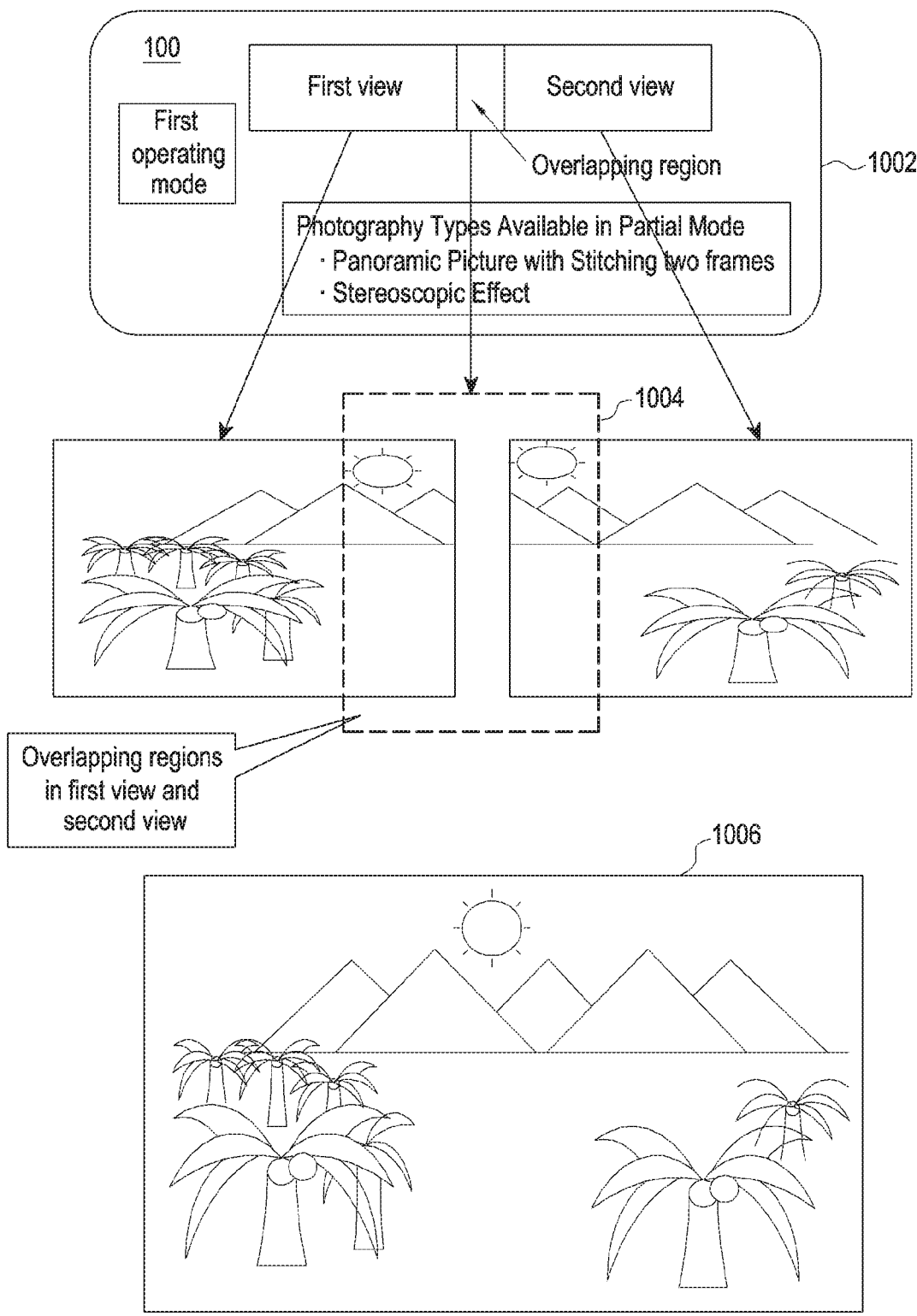
FIG. 10 is an example illustrating an application of a panorama effect in the first operating mode to the composite view of the scene, according to an embodiment.

FIG. 10 is an example illustrating the application of the panorama effect in the first operating mode to the composite view of the scene, according to an embodiment as disclosed herein.

In the conventional methods and systems, the panorama effect is provided by activating the image sensors and horizontally moving the image sensors to capture the panoramic image. Unlike the conventional methods and systems, in the proposed method the panorama effect is provided by capturing the first view and the second view of the scene with overlapping portions in the first view and the second view and stitching the first view and the second view to obtain the composite view of the scene.

Referring to the FIG. 10, at step 1002, the electronic device 100 determines that the bend angle is such that the first view and the second view partially overlap in the live preview. Further, the electronic device 100 determines that the first image sensor and the second image sensor have to be operated in the first operating mode as the first view and the second view partially overlap with each other.

Further, the electronic device 100 displays the imaging options associated with the first operating mode and detects that the imaging option selected by the user is panorama effect.

At step 1004, in the electronic device 100 automatically identifies the overlapping portions in the first view and the second view of the scene. At step 1006, the electronic device 100 stitches the overlapping portions of the first view and the second view to produce the composite view of the scene.

In an embodiment, when the user manually selects the panorama effect when the electronic device 100 is not in the first operating mode, then the electronic device 100 displays the required bend angle information so that the user may bend the electronic device to the required angle for the panorama effect.

Unlike the conventional methods and systems, where the panorama effect is produced by horizontally moving the image sensor to capture the scene, the proposed method does not require the user to horizontally move the image sensor to capture the scene. The proposed method determines the overlapping regions in the first view and the second view and stitches the two to obtain the complete scene.

Figure 11:
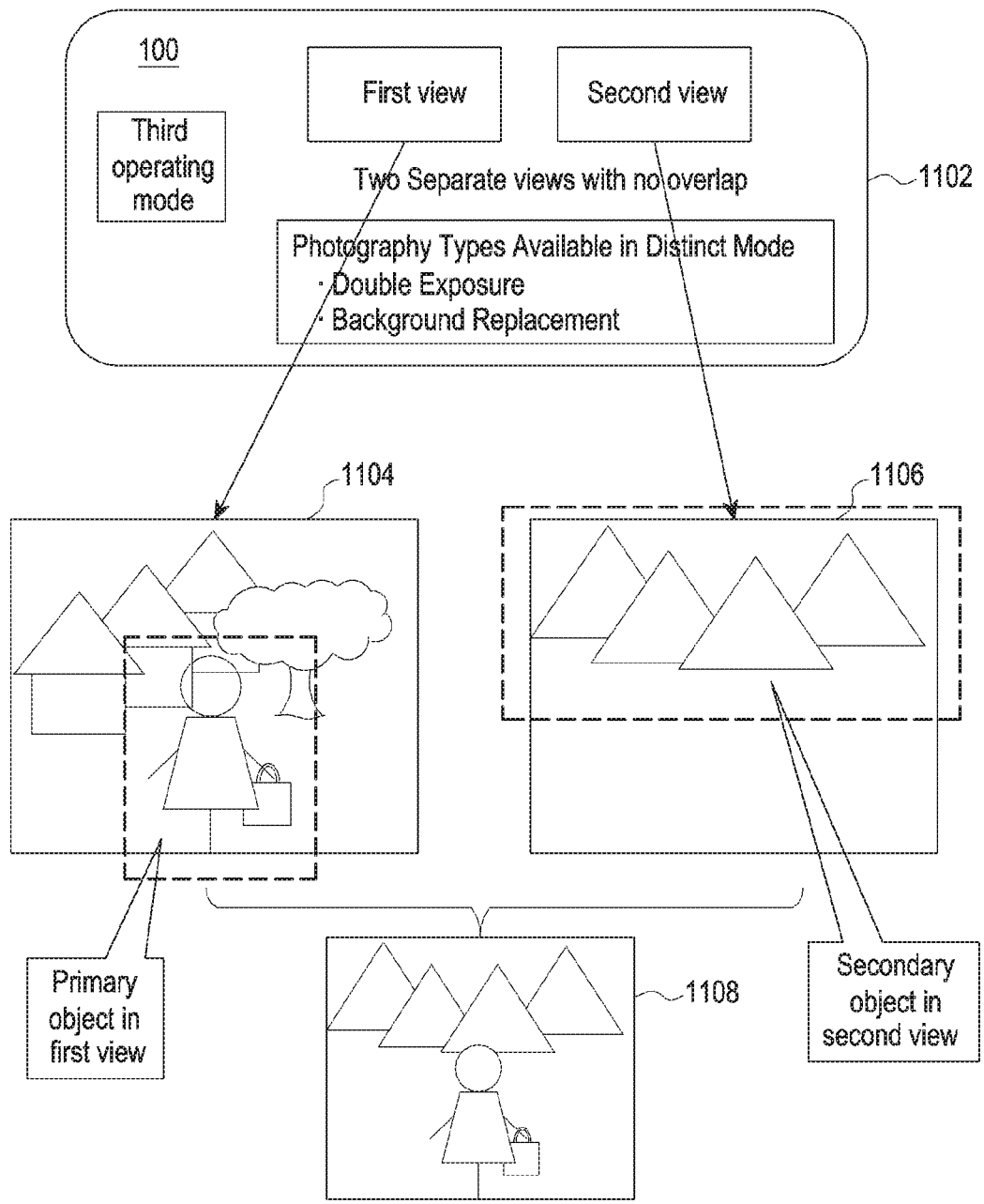
FIG. 11 is an example illustrating the application of a background replacement effect in a third operating mode to the composite view of the scene, according to an embodiment.

FIG. 11 is an example illustrating the application of the background replacement effect in the third operating mode to the composite view of the scene, according to an embodiment as disclosed herein.

Referring to the FIG. 11, at step 1102, the electronic device 100 determines that the bend angle is such that the first view and the second view do not overlap in the live preview. Further, the electronic device 100 determines that the first image sensor and the second image sensor have to be operated in the third operating mode as the first view and the second view do not overlap with each other.

Further, the electronic device 100 displays the imaging options associated with the third operating mode and detects that the imaging option selected by the user is background replacement effect.

At step 1104, the electronic device 100 automatically identifies the primary object as the human in the first view. At step 1106, the electronic device 100 identifies the secondary object as the mountains in the second view. Further, the electronic device 100 produces the composite view by replacing the background area in the first view having the primary object with the secondary object from the second view and displays the composite view on the screen, as shown in step 1108.

Figure 12:
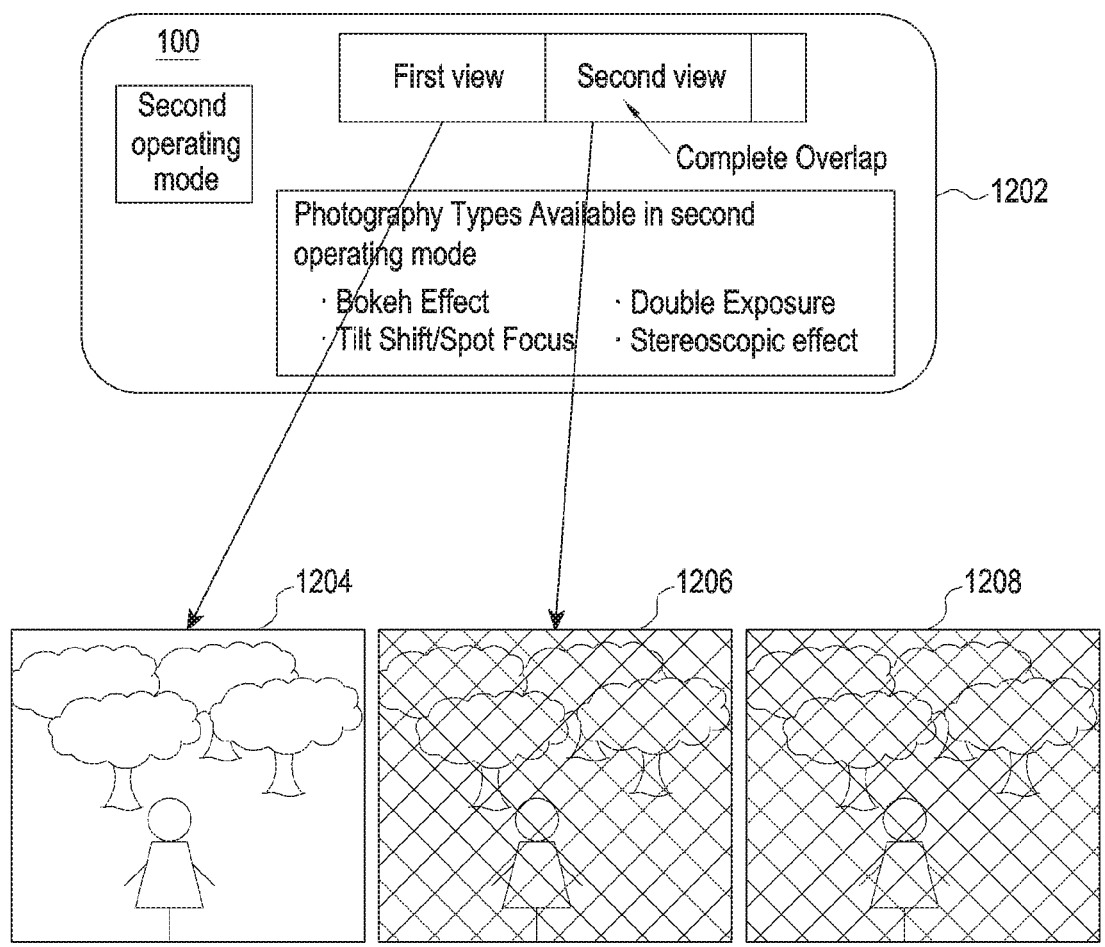
FIG. 12 is an example illustrating the application of a bokeh effect in a second operating mode to the composite view of the scene, according to an embodiment.

FIG. 12 is an example illustrating the application of the bokeh effect in the second operating mode to the composite view of the scene, according to an embodiment as disclosed herein.

Referring to the FIG. 12, at step 1202, the electronic device 100 determines that the bend angle is such that the first view and the second view completely overlap in the live preview. Further, the electronic device 100 determines that the first image sensor and the second image sensor have to be operated in the second operating mode as the first view and the second view completely overlap.

Further, the electronic device 100 displays the imaging options associated with the second operating mode and detect the imaging option selected by the user as bokeh effect.

At step 1204, in the bokeh effect mode the electronic device 100 is configured to automatically operate the first image sensor in a shorter focal length to capture the first image.

At step 1206, the electronic device 100 is configured to automatically operate the second image sensor in the pan focal length to capture the second image, where the second image is the completely blurred version of the first image. The second image is also captured in the same shape as the first image.

At step 1208, the composite view is produced by blending the first image and the second image to provide the bokeh effect.

Figure 13:
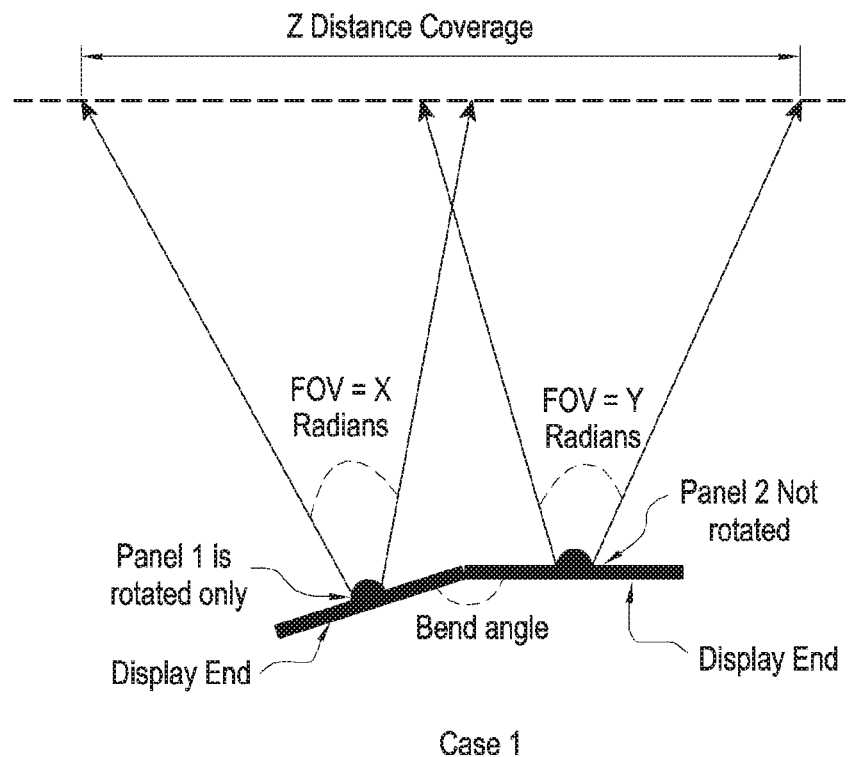
FIG. 13 is an example illustrating a capture of the first view and the second view containing an audio content along with an image, according to an embodiment.
Figure 13:
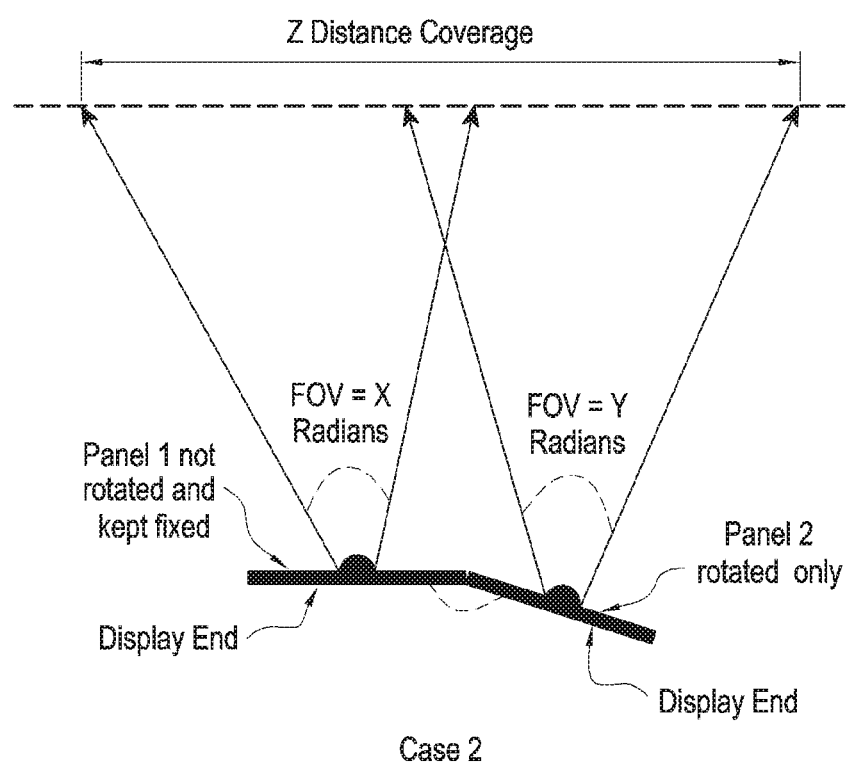

FIG. 13 is an example illustrating the capture of the first view and the second view containing the audio content along with the image, according to an embodiment as disclosed herein.

Referring to the FIG. 13, in an example, consider that the electronic device 100 displays the first view, the second view and the bend angle information on the screen.

Further, the electronic device 100 displays a plurality of imaging options corresponding to the bend angle on the screen and allows the user to select one of the imaging options. The electronic device 100 determines that the user selects the imaging option where the audio content needs to be recorded while capturing the first scene and the second scene.

In response to determining the imaging option selected by the user, the electronic device 100 determines the new bend angle which is required to record the audio content while capturing the first scene and the second scene. The electronic device 100 then manipulates the first view and the second view by applying the imaging option selected by the user based on the new bend angle. Further, the first image sensor captures the audio content along with the image content in the first view of the scene. The second image sensor captures the audio content along with the image content in the second view of the scene. Furthermore, the electronic device 100 displays the manipulated first view and the manipulated second view of the scene on the screen.

In an embodiment, the first image sensor and the second image sensor may capture only the audio content associated with the first scene and the second scene respectively.

The foregoing description of the specific embodiments sets forth the general nature of the embodiments herein such that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A method for capturing view in an electronic device including at least two image sensors, the method comprising:
    determining a folding angle between a first side of the electronic device including a first image sensor and a second side of the electronic device including a second image sensor;
    capturing a first view of a scene using the first image sensor;
    capturing a second view of the scene using the second image sensor;
    determining an operating mode from among a plurality of operating modes based on the folding angle;
    determining, from among a plurality of imaging options corresponding to the plurality of operating modes, imaging options corresponding to the determined operating mode; and
    displaying a plurality of display elements representing the determined imaging options.

2. The method of claim 1, wherein the determining the folding angle comprises:
    measuring a reading of a magnetometer when a first electromagnet and a second electromagnet are turned off;
    detecting that the first electromagnet is turned on;
    determining a reading of the magnetometer when the first electromagnet is turned on and the second electromagnet is turned off without folding;
    determining a difference between the reading of the magnetometer when the first electromagnet and the second electromagnet are turned off and the reading of the magnetometer when the first electromagnet is turned on without folding;
    determining a reading of the magnetometer when the first electromagnet is turned on and the second electromagnet is turned off with folding; and
    determining the folding angle of the electronic device based on the difference and the reading of the magnetometer when the first electromagnet is turned on and the second electromagnet is turned off with folding.

3. The method of claim 1, further comprising:
    determining at least one first operating mode when the first view partially overlaps with the second view, at least one second operating mode when the first view completely overlaps with the second view, and a third operating mode when the first view does not overlap with the second view;
    automatically configuring the electronic device in the determined at least one first, at least one second, or third operating mode to produce a composite view;
    automatically displaying the first view and the second view of the scene in the determined at least one first, at least one second, or third operating mode;
    displaying the first view, the second view and the folding angle on the electronic device;
    detecting an imaging option selected from the plurality of imaging options;

determining a new folding angle required for the selected imaging option;

manipulating the first view and the second view by applying the selected imaging option based on the new folding angle; and displaying the manipulated first view and the manipulated second view on the electronic device.

4. The method of claim 3, wherein the at least one first operating mode is one from among a panorama mode, an object removal mode, and a stereoscopic effect mode, wherein the at least one second operating mode is one from among a bokeh effect mode, a tilt shift/spot focus mode, a double exposure mode, and the stereoscopic effect mode, and wherein the third operating mode is one from among the double exposure mode and a background replacement mode, wherein in the object removal mode, the electronic device is configured to automatically retain background information in the composite view of the scene when an object is removed from at least one of the first view and the second view, wherein in the double exposure mode, the electronic device is configured to automatically blend at least one portion of the first view with at least one portion of the second view to produce the composite view illustrating an artistic effect of double exposure, wherein in the panorama mode, the electronic device is configured to automatically stitch at least one overlapping portion of the first view and the second view to produce the composite view, wherein in the stereoscopic effect mode, the electronic device is configured to automatically encode the first view and the second view using filters of different colors and produce the composite view by shifting a perspective of the first view and the second view and overlapping the first view and the second view, wherein in the bokeh effect mode, the electronic device is configured to automatically operate the first image sensor in a shorter focal length to capture a first image and the second image sensor in a pan focal length to capture a second image in a same shape as a shape of the first image, and produce the composite view, wherein the composite view is produced by blurring the first view and blending the blurred first view with the second view, wherein in the tilt shift/spot focus mode, the electronic device is configured to automatically operate the first image sensor in the shorter focal length to capture the first image and the second image sensor in a linear or radial focal length to capture the second image in the same shape as the shape of the first image, and produce the composite view, wherein the composite view is produced by blurring the first view and blending the blurred first view with the second view, and wherein in the background replacement mode, the electronic device is configured to automatically identify a primary object in the first view and a secondary object in the second view and produce the composite view by replacing a remaining area in the first view with the secondary object.

5. The method of claim 4, wherein the composite view in the panorama mode is produced by:

determining whether the second image sensor is in an independent operating mode or an assisted operating mode;

generating the composite view by stitching the first view of the scene with the second view of the scene when the second image sensor is in the independent operating mode; and generating the composite view by superimposing the second view of the scene with the first view of the scene when the second image sensor is in the assisted operating mode.

6. The method of claim 1, wherein the electronic device includes a first microphone associated with the first image sensor and a second microphone associated with the second image sensor, wherein the first view comprises at least one of image content captured using the first image sensor and audio content captured using the first microphone, and the second view comprises at least one of image content captured using the second image sensor and audio content captured using the second microphone, wherein an intensity of the audio content is dynamically changed based on the folding angle of the electronic device, wherein the second view is captured by the second image sensor in response to detecting a gesture performed to fold the electronic device, and wherein the first view of the scene is different from the second view of the scene.

7. The method of claim 1, further comprising:

producing a composite view based on the determined operating mode.

8. An electronic device comprising:

at least two image sensors including a first image sensor and a second image sensor;

a display;

a memory; and at least one processor coupled to the memory, wherein the at least one processor is configured to:

determine a folding angle between a first side of the electronic device including the first image sensor and a second side of the electronic device including the second image sensor;

capture a first view of a scene using the first image sensor;

capture a second view of the scene using the second image sensor;

determine an operating mode from among a plurality of operating modes based on the folding angle;

determine, from among a plurality of imaging options corresponding to the plurality of operating modes, imaging options corresponding to the determined operating mode; and control the display to display a plurality of display elements representing the determined imaging options.

9. The electronic device of claim 8, wherein the at least one processor is further configured to:

measure a reading of a magnetometer when a first electromagnet and a second electromagnet are turned off;

detect that the first electromagnet is turned on;

determine a reading of the magnetometer when the first electromagnet is turned on and the second electromagnet is turned off without folding;

determine a difference between the reading of the magnetometer when the first electromagnet and the second electromagnet are turned off and the reading of the magnetometer when the first electromagnet is turned on without folding;

determine a reading of the magnetometer when the first electromagnet is turned on and the second electromagnet is turned off with folding; and determine the folding angle of the electronic device based on the difference and the reading of the magnetometer when the first electromagnet is turned on and the second electromagnet is turned off with folding.

10. The electronic device of claim 8, wherein the at least one processor is further configured to:

determine whether the first view and the second view partially overlap with each other, completely overlap with each other, or do not overlap with each other based on the folding angle;

determine at least one first operating mode when the first view partially overlaps with the second view, at least one second operating mode when the first view completely overlaps with the second view, and a third operating mode when the first view does not overlap with the second view;

automatically configure the electronic device in the determined at least one first, at least one second, or third operating mode to produce a composite view;

automatically display the first view and the second view of the scene in the determined at least one first, at least one second, or third operating mode;

display the first view, the second view and the folding angle on the electronic device;

detect an imaging option selected from the plurality of imaging options;

determine a new folding angle required for the selected imaging option;

manipulate the first view and the second view by applying the selected imaging option based on the new folding angle; and display the manipulated first view and the manipulated second view on the electronic device.

11. The electronic device of claim 10, wherein the at least one first operating mode is one from among a panorama mode, an object removal mode, and a stereoscopic effect mode, wherein the at least one second operating mode is one from among a bokeh effect mode, a tilt shift/spot focus mode, a double exposure mode, the stereoscopic effect mode, and wherein the third operating mode is one from among the double exposure mode and a background replacement mode, wherein in the object removal mode, the electronic device is configured to automatically retain background information in the composite view of the scene when an object is removed from at least one of the first view and the second view, wherein in the double exposure mode, the electronic device is configured to automatically blend at least one portion of the first view with at least one portion of the second view to produce the composite view illustrating an artistic effect of double exposure, wherein in the panorama mode, the electronic device is configured to automatically stitch at least one overlapping portion of the first view and the second view to produce the composite view, wherein in the stereoscopic effect mode, the electronic device is configured to automatically encode the first view and the second view using filters of different colors and produce the composite view by shifting a perspective of the first view and the second view and overlapping the first view and the second view, wherein in the bokeh effect mode, the electronic device is configured to automatically operate the first image sensor in a shorter focal length to capture a first image and the second image sensor in a pan focal length to capture a second image in a same shape as a shape of the first image, and produce the composite view, wherein the composite view is produced by blurring the first view and blending the blurred first view with the second view, wherein in the tilt shift/spot focus mode, the electronic device is configured to automatically operate the first image sensor in the shorter focal length to capture the first image and the second image sensor in a linear or radial focal length to capture the second image in the same shape as the shape of the first image, and produce the composite view, wherein the composite view is produced by blurring the first view and blending the blurred first view with the second view, and wherein in the background replacement mode, the electronic device is configured to automatically identify a primary object in the first view and a secondary object in the second view and produce the composite view by replacing a remaining area in the first view with the secondary object.

12. The electronic device of claim 11, wherein the at least one processor is further configured to:

determine whether the second image sensor is in an independent operating mode or an assisted operating mode;

generate the composite view by stitching the first view of the scene with the second view of the scene when the second image sensor is in the independent operating mode; and generating the composite view by superimposing the second view of the scene with the first view of the scene when the second image sensor is in the assisted operating mode.

13. The electronic device of claim 12, wherein the at least one processor is further configured to:

determine a first group of imaging options of the first image sensor;

determine a second group of imaging options of the second image sensor;

sort the first group of imaging options and the second group of imaging options based on user preferences;

overlay a first group of display elements representing the first group of imaging options of the first image sensor over a second group of display elements representing the second group of imaging options of the second image sensor based on the folding angle;

display the overlaid first and second group of display elements of the first image sensor and the second image sensor on the composite view of the scene;

detect the imaging option selected from the first and second group of imaging options;

determine the new folding angle required for the selected imaging option;

manipulate the first view and the second view by applying the selected imaging option based on the new folding angle;

display the manipulated first view and the manipulated second view on the electronic device;

detect a capture event performed by a user; and capture the composite view as a single image, wherein the first group of display elements is overlaid with the second group of display elements by modifying at least one display element representing at least one imaging option from among the first and second group of display elements based on the folding angle.

14. The electronic device of claim 8, further comprising a first microphone associated with the first image sensor and a second microphone associated with the second image sensor,
   wherein the first view comprises at least one of image content captured using the first image sensor and audio content captured using the first microphone, and the second view comprises at least one of image content captured using the second image sensor and audio content captured using the second microphone, wherein an intensity of the audio content is dynamically changed based on the folding angle of the electronic device,
   wherein the second view is captured by the second image sensor in response to detecting a gesture performed to fold the electronic device, and
   wherein the first view of the scene is different from the second view of the scene.

15. A wearable electronic device comprising:
   at least two image sensors including a first image sensor and a second image sensor;
   a display; and
   at least one processor configured to:
      determine a folding angle between a first part of the wearable electronic device including the first image sensor and a second part of the wearable electronic device including the second image sensor;
      capture a first view of a scene using the first image sensor;
      capture a second view of the scene using the second image sensor;
      determine an operating mode from among a plurality of operating modes based on the folding angle;
      determine, from among a plurality of imaging options corresponding to the plurality of operating modes, imaging options corresponding to the determined operating mode; and
      control the display to display a plurality of display elements representing the determined imaging options.

16. The wearable electronic device of claim 15, wherein the at least one processor is further configured to:
   detect a gesture to change the folding angle;
   determine a changed folding angle based on the gesture;
   capture a third view of the scene using the first image sensor;
   capture a fourth view of the scene using the second image sensor; and
   determine whether the third view and the fourth view partially overlap with each other, completely overlap with each other, or do not overlap with each other based on the changed folding angle.

17. The wearable electronic device of claim 16, further comprising a first microphone associated with the first image sensor and a second microphone associated with the second image sensor,
   wherein the first view comprises at least one of image content captured using the first image sensor and audio content captured using the first microphone, and the second view comprises at least one of image content captured using the second image sensor and audio content captured using the second microphone, wherein an intensity of the audio content is dynamically changed based on the folding angle of the wearable electronic device.

18. A foldable electronic device comprising:
   a fixed folding axis;
   a first image sensor provided on a first side of the fixed folding axis;
   a second image sensor provided on a second side of the fixed folding axis;
   a sensor configured to determine a folding angle between the first side and the second side;
   a display; and
   a processor configured to:
      select an image capturing mode from among a plurality of image capturing modes based on the folding angle;
      determine, from among a plurality of imaging options corresponding to the plurality of image capturing modes, imaging options corresponding to the determined image capturing mode; and
      control the display to display a plurality of display elements representing the determined imaging options.

19. The foldable electronic device of claim 18,
   wherein the plurality of image capturing modes comprises a fully overlapping mode in which images captured by the first and second image sensors are fully overlapping, a partially overlapping mode in which the images captured by the first and second image sensors are partially overlapping, and a non-overlapping mode in which the images captured by the first and second image sensors are not overlapping.

20. The foldable electronic device of claim 19,
   wherein, in response to a photo effect being selected that requires a new folding angle, the processor is configured to control the display to display a display element representing information on the new folding angle.

* * * * *